(12) United States Patent
Watanabe et al.

(10) Patent No.: US 6,299,025 B1
(45) Date of Patent: Oct. 9, 2001

(54) FROZEN DESSERT DISPENSER

(75) Inventors: Mamoru Watanabe; Tsutomu Iwata; Yasuo Hara; Hironori Rikiishi, all of Shimane (JP)

(73) Assignee: Hoshizaki Denki Co., Ltd., Aighi (JP)

( * ) Notice: Subject to any disclaimer, the term of this patent is extended or adjusted under 35 U.S.C. 154(b) by 0 days.

(21) Appl. No.: 09/521,204

(22) Filed: Mar. 8, 2000

(30) Foreign Application Priority Data

| Mar. 8, 1999 | (JP) | ................................................ 11-060680 |
| Mar. 8, 1999 | (JP) | ................................................ 11-060683 |
| Mar. 24, 1999 | (JP) | ................................................ 11-078927 |

(51) Int. Cl.$^7$ ...................................................... B67D 5/62
(52) U.S. Cl. ...................... 222/146.6; 222/389; 222/509
(58) Field of Search ............................. 222/146.6, 509, 222/518, 389

(56) References Cited

U.S. PATENT DOCUMENTS

| 2,156,518 | * | 5/1939 | Titus ..................................... 222/509 |
| 3,677,443 | | 7/1972 | Smadar et al. . |
| 5,048,724 | * | 9/1991 | Thomas ......................... 222/146.6 X |
| 5,150,820 | | 9/1992 | McGill . |
| 5,400,614 | | 3/1995 | Feola . |
| 5,405,054 | * | 4/1995 | Thomas ......................... 222/146.6 X |
| 5,421,484 | * | 6/1995 | Beach ............................. 222/146.6 X |
| 5,463,877 | * | 11/1995 | Young et al. .................. 222/146.6 X |
| 5,492,249 | * | 2/1996 | Beach ............................. 222/146.6 X |
| 5,494,194 | * | 2/1996 | Topper et al. ................. 222/146.6 X |
| 5,620,115 | * | 4/1997 | McGill ........................... 222/146.6 X |
| 5,700,494 | | 12/1997 | Masse et al. . |
| 5,811,001 | * | 9/1998 | Chang ............................. 222/146.6 X |
| 6,019,254 | * | 2/2000 | Kameyama et al. .......... 222/146.6 X |
| 6,119,905 | * | 9/2000 | Cocchi et al. ....................... 222/509 |

FOREIGN PATENT DOCUMENTS

| 459 865 | 7/1968 | (CH) . |
| 1386722 | 5/1965 | (FR) . |
| 2 154 204 | 9/1985 | (GB) . |
| 2 318 839 | 5/1998 | (GB) . |
| 63-263051 | 10/1988 | (JP) . |
| 3-297354 | 12/1991 | (JP) . |
| 11155493 | 6/1999 | (JP) . |

\* cited by examiner

Primary Examiner—Kenneth Bomberg
(74) Attorney, Agent, or Firm—Wenderoth, Lind & Ponack, L.L.P.

(57) ABSTRACT

A frozen dessert dispenser includes a freezing compartment accommodating a frozen dessert dispensing cylinder, a dispensing section provided on an outer wall of the freezing compartment, the dispensing section including a vertically extending dispensing passage and a valve element slidably provided in the dispensing passage, and a connecting pipe communicating with a side of the dispensing passage and projecting into the freezing compartment to be connected to a discharge side of the dispensing cylinder. A portion of the dispensing passage communicating with the connecting pipe is closed and opened by the valve element and the connecting pipe is detachably attached to the dispensing passage.

32 Claims, 22 Drawing Sheets

FROZEN DESSERT DISPENSER

BACKGROUND OF THE INVENTION

1. Field of the Invention

This invention relates generally to a frozen dessert dispenser for dispensing a frozen dessert such as ice cream or yogurt, and more particularly to an improvement in the structure of a dispensing section of the frozen dessert dispenser.

2. Description of the Prior Art

An ice cream dispenser as shown in FIG. 21 has conventionally been known. The shown dispenser comprises a dispensing cylinder 103 provided at the back of a door 101 of a freezing compartment 100 in a vertical disposition. A piston 102 is provided in the cylinder 103 so as to be slid. A dispensing section 106 is mounted on an outer face of the door 101. The dispensing section 106 has a vertical dispensing passage 105. A valve element 104 is provided to ascend and descend in the dispensing passage 105. A connecting pipe 107 communicating with the passage 105 protrudes into the freezing compartment 100. The connecting pipe 107 has a protruding end connected to a supply opening C of a pack B of ice cream accommodated in an upper interior of the piston 102 of the dispensing cylinder 103.

In the above-described construction, the valve element 104 ascends so that a communicating port 108 between the connecting pipe 107 and the dispensing passage 105 is opened. When a pump 109 is driven so that an operating fluid is supplied to a lower interior of the piston 102, the piston ascends such that the pack B is compressed. Ice cream in the pack B is dispensed through the connecting pipe 107, the communicating port 108 and the dispensing passage 105.

Ice cream adheres to an inner surface of the dispensing passage 105 serving as a dispensing route inside the dispensing section 106 and the connecting pipe 107. This is undesirable from the viewpoint of sanitation. Accordingly, the dispensing passage 105 and the connecting pipe 107 need to be cleaned. In the cleaning, the connecting pipe 107 is pulled out and the dispensing section 106 is detached from the door 101, so that the dispensing route including the dispensing passage 105 and the connecting pipe 107 is cleaned in water.

However, the connecting pipe 107 projects integrally from the dispensing section 106 in the above-described construction. The connecting pipe 107 communicates with the dispensing passage 105 through the communicating port 108. The interior of the dispensing section 106 near the communicating port 108 cannot be sufficiently cleaned. When the interior of the passage 105 is cleaned with a brush, the inner circumferential surface of the passage 105 is sometimes scratched. The scratch results in leakage of ice cream from a gap between the valve element 104 and the passage 105. In view of the above problem, brushes are not used in the cleaning. As a result, the interior of the dispensing section 106 near the communicating port 108 remains uncleaned.

SUMMARY OF THE INVENTION

Therefore, an object of the present invention is to provide a frozen dessert dispenser in which the dispensing route inside the dispensing section can be cleaned easily and sufficiently.

The present invention provides a frozen dessert dispenser comprising a freezing compartment accommodating a frozen dessert dispensing cylinder therein, a dispensing section provided on an outer wall of the freezing compartment, the dispensing section including a vertically extending dispensing passage and a valve element provided in the dispensing passage so as to be slid, and a connecting pipe communicating with a side of the dispensing passage and projecting into the freezing compartment to be connected to a discharge side of the dispensing cylinder. In the dispenser, a portion of the dispensing passage communicating with the connecting pipe is closed and opened by the valve element and the connecting pipe is detachably attached to the dispensing passage.

According to the above-described construction, the connecting pipe is detachably attached to the dispensing section. Consequently, the dispensing section and the connecting pipe can be cleaned separately from each other when the connecting pipe is detached from the dispensing section in the cleaning. Moreover, the portion of the dispensing passage communicating with the connecting pipe is opened when the connecting pipe is detached from the dispensing section. Consequently, the dispensing route can be cleaned easily and sufficiently over the whole length and breadth thereof.

In a preferred form, the connecting pipe has an inner surface on which fluorine-contained resin layer is formed. In another preferred form, the dispensing section includes a side located at the freezing compartment side and having a hole communicating with the dispensing passage. Further, the connecting pipe has a proximal end side fitted in the hole of the dispensing section and includes a flange formed along an outer circumference thereof so as to abut an open edge of the hole. Further, the open edge of the hole has a pin standing therefrom wherein the pin has a mounting groove, the flange of the connecting pipe has an engagement hole engaging the mounting groove, and the connecting pipe is turned about an axis thereof so that the engagement hole engages and disengages from the mounting groove.

In another preferred form, the connecting pipe includes a portion located at the dispensing section side and having a smaller outer diameter than another portion thereof located at the freezing compartment side. In another preferred form, a closed heat-insulating space is defined along the outer circumference of the connecting pipe. In another preferred form, the heat-insulating space is a vacuum.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
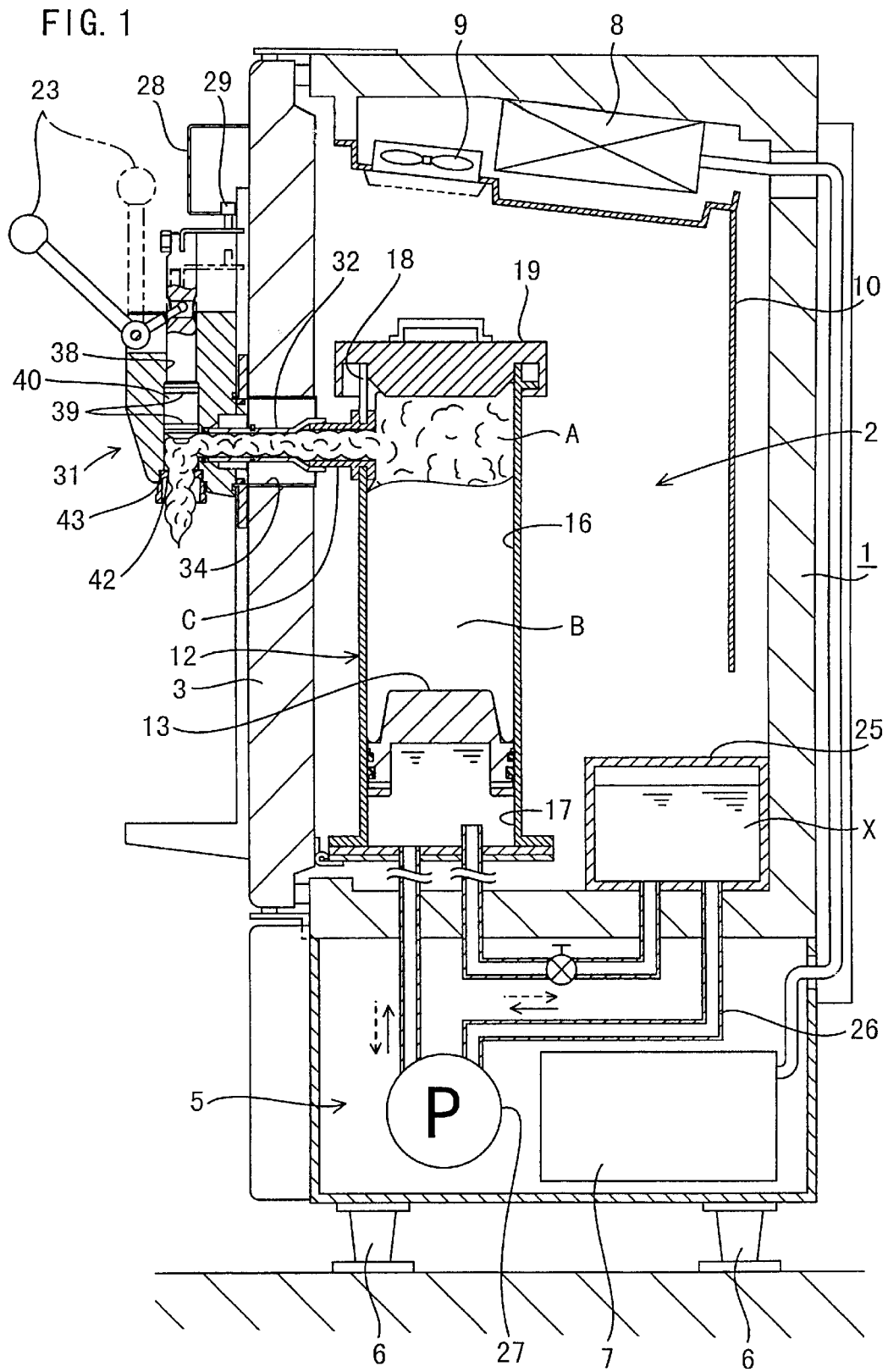
FIG. 1 is a longitudinally sectional view of an ice cream dispenser of a first embodiment in accordance with the present invention.

Several embodiments of the present invention will be described with reference to the accompanying drawings. FIGS. 1 to 7 show a first embodiment in which the invention is applied to an ice cream dispenser. Referring to FIG. 1, the ice cream dispenser comprises a freezer 1 further comprising a heat-insulated housing. The freezer 1 has an interior serving as a freezing compartment 2. A heat-insulated door 3 is mounted on the front of the freezer 1 to open and close a front opening of the heat-insulated housing. A machine compartment 5 is provided under the freezer 1. The freezer 1 is supported on four support legs 6 provided on corners of the bottom thereof respectively. An evaporator 8 and an inside fan 9 are provided on a ceiling of the freezing compartment 2. The evaporator 8 is connected to a refrigeration unit 7 provided in the machine compartment 5. Air in the freezing compartment 2 is sucked in through a duct 10 provided in the rear interior of the freezing compartment 2 and supplied to the evaporator 8 for heat exchange. The air is changed to cold air while passing through the evaporator 8, and the cold air is circulated by the fan 9 into the freezing compartment 2. A temperature in the freezing compartment 2 is maintained at such a value that ice cream can be preserved while being able to be dispensed.

A dispensing cylinder 12 is mounted at the back of the heat-insulated door 3 in a front interior of the freezing compartment 2 in a vertical disposition. The dispensing cylinder 12 is inclined by a link mechanism (not shown). A piston 13 is provided in the cylinder 12 so as to be slid therein. An operating fluid such as brine (antifreeze) X is used to drive the piston 13. The interior of the cylinder 12 at an upper side of the piston 13 is defined as a pack-accommodating chamber 16. A pressure chamber 17 is defined in the interior of the cylinder 12 at the backside of the piston 13. The cylinder 12 has a generally U-shaped groove 18 formed in an upper side thereof confronting the heat-insulated door 3 so as to extend downward from an upper edge thereof A flexible pack B filled with ice cream A is accommodated in the pack-accommodating chamber 16. The pack B has a supply opening C which is fitted in the U-shaped groove 18 when the pack is accommodated in the chamber 16. The chamber 16 has an upper opening to which a lid 19 is detachably mounted. A dispensing section 31 is provided on an upper outer face of the door 3 as will be described in detail later. A connecting pipe 32 horizontally projects rearward from a rear of the dispensing section 31, extending through the door 3 slightly into the freezing compartment 2. The supply opening C of the pack B is connected to a projecting end of the connecting pipe 32.

A tank 25 storing the brine X is provided on the rear bottom of the freezing chamber 2. A brine passage 26 connects the tank 25 to the pressure chamber 17 of the cylinder 12. A reversible pump 27 is provided in the middle of the brine passage 26. The pump 27 is disposed in the machine compartment 5. When the pump 27 is driven in a normal direction, the brine X is supplied from the tank 25 into the pressure chamber 17 as shown by solid-line arrows in FIG. 1. On the other hand, when the pump 27 is driven in a reverse direction, the brine X is returned from the pressure chamber 17 into the tank 25 as shown by broken-line arrows in FIG. 1. An operation panel 28 is mounted on an upper front of the heat-insulated door 3. The operation panel 28 includes a dispensing switch 29 turned on and off in response to an opening operation (solid line in FIG. 1) and a closing operation of (broken line in FIG. 1) the cock 23.

Figure 4:
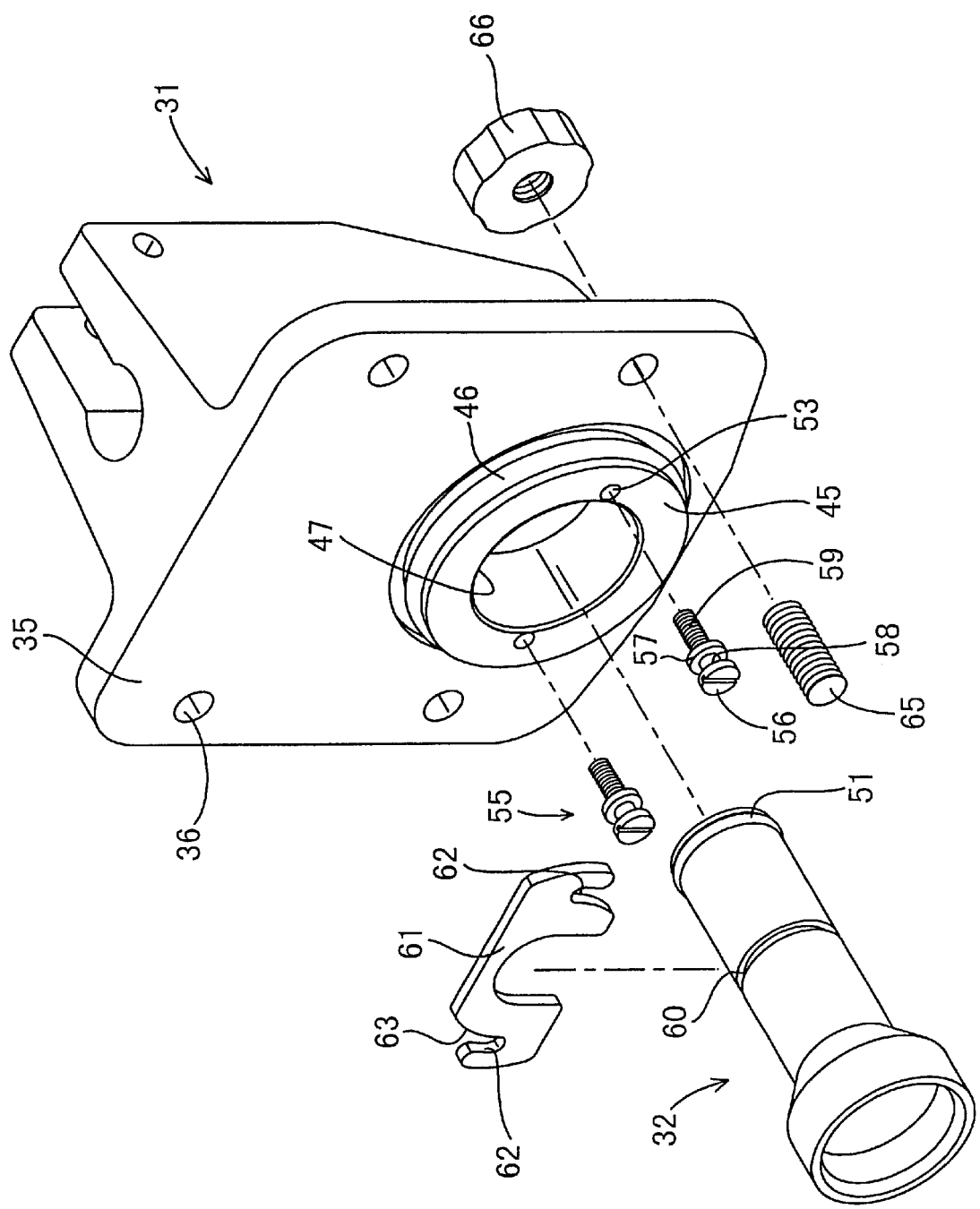
FIG. 4 is an exploded perspective view of the dispensing mechanism.

The dispensing section 31 and the mounting structure there for will be described in detail. The heat-insulated door 3 has through hole 34 formed therethrough so as to correspond to the dispensing section 31. The dispensing section 31 is made of a synthetic resin into the shape of a block having a generally T-shape transverse section. A generally square mounting plate 35 is formed on an inner face side of the dispensing section 31 which abuts the heat-insulated door 3 as shown in FIG. 4. The mounting plate 35 has insertion holes 36 formed through four corners thereof respectively. Screws 65 are screwed through the respective holes 36. A vertically extending dispensing passage 38 is formed inside a right-hand protruding portion of the dispensing section 31 as viewed in FIG. 2. A valve element 40 is tightly fitted in the dispensing passage 38 so as to be vertically moved. Two O-rings 39 are attached to upper and lower portions of the valve element 40, respectively. The valve element 40 is connected to the cock 23 rotatably mounted on an outer upper portion of the dispensing section 31. A cap 43 constituting a dispensing port 42 is screwed to a lower end of the dispensing passage 38.

Figure 2:
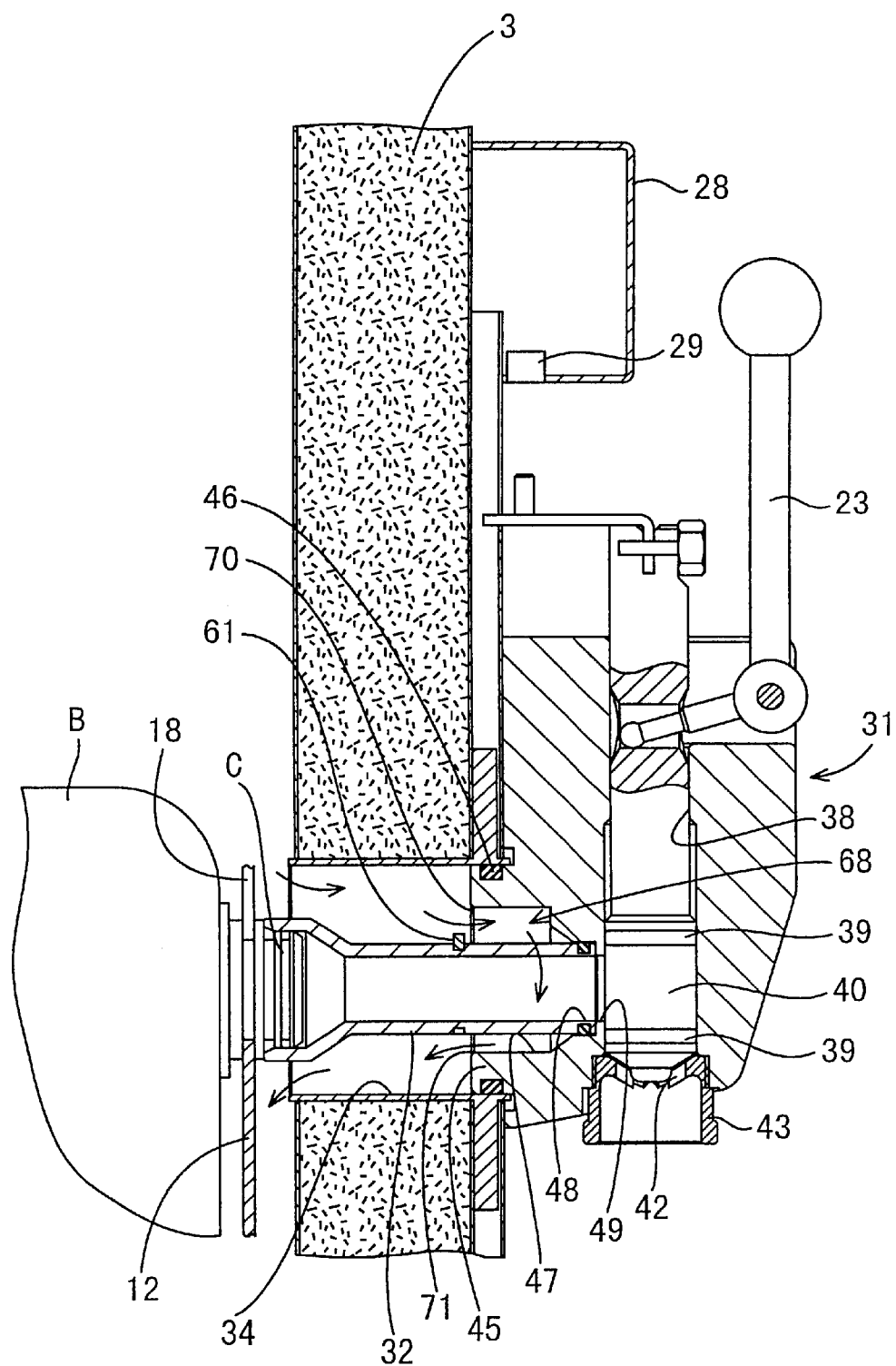
FIG. 2 is an enlarged section of a dispensing mechanism.
Figure 3:
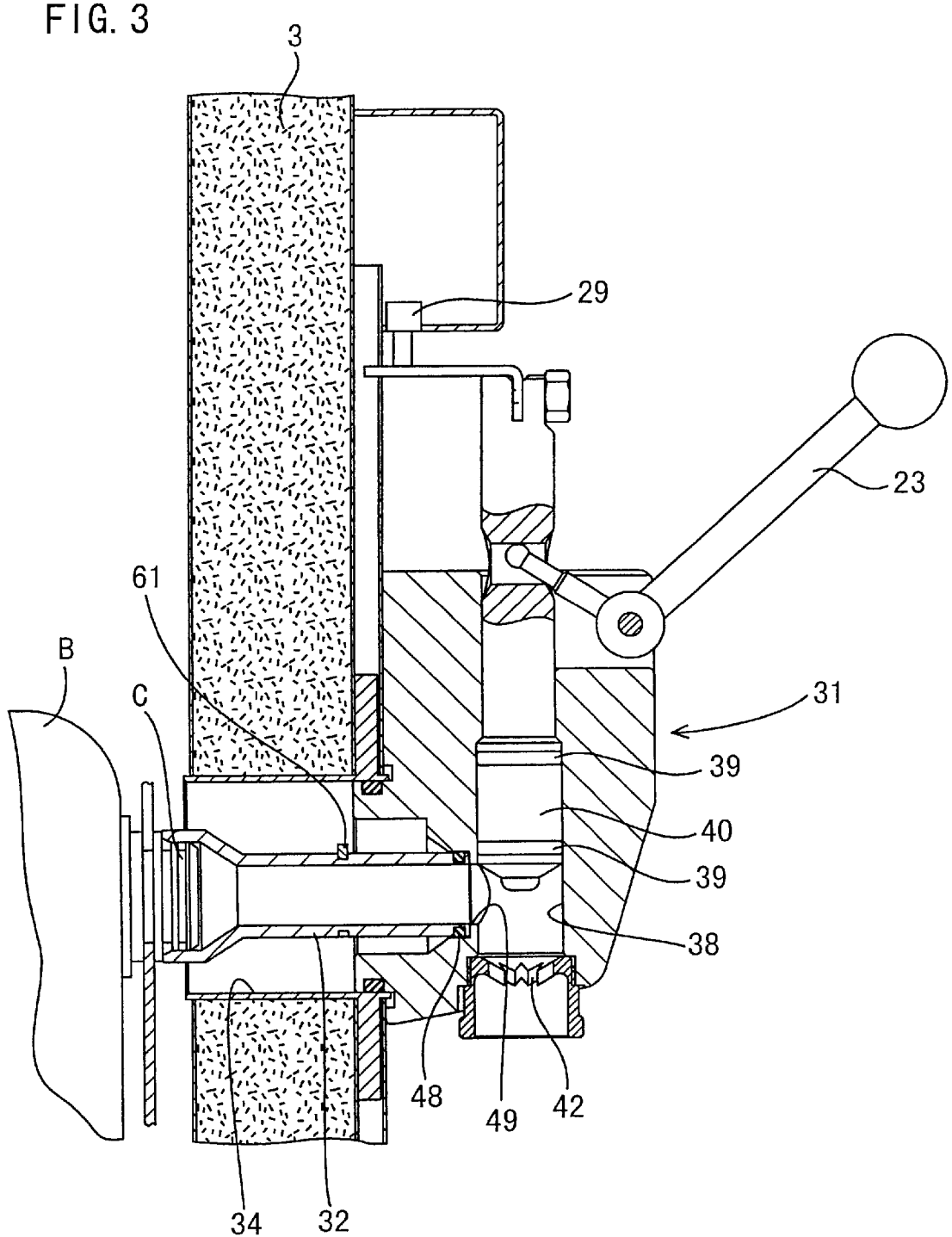
FIG. 3 is also an enlarged section of the dispensing mechanism, showing the case where a cock is opened.

An annular boss 45 is formed on a lower portion of the surface of the mounting plate 35 so as to slightly protrude. An O-ring 46 is attached to an outer circumference of the boss 45. The boss 45 is air tightly fitted in the hole 34 of the heat-insulated door 3. The boss 45 has a central hole 47 and a mounting hole 48 formed deep in the hole 47 so as to be eccentric slightly downward thereto. The diameter of the hole 47 is gradually reduced toward the hole 48. Accordingly, the hole 48 has a reduced diameter. The hole 48 has a stepped communicating port 49 formed deep therein and having a further reduced diameter. The mounting hole 48 communicates via the port 49 with the lower end side of the dispensing passage 38. When the cock 23 is moved to an upper position, the valve element 40 occupies a lowered position as shown in FIG. 2 such that the upper and lower O-rings 39 are located at upper and lower ends of the port 49, thereby closing the port. On the other hand, when the cock 23 is lowered, the valve element 40 is moved upward such that the lower O-ring 39 is raised above the port 49 as shown in FIG. 3. As a result, the ports 49 and 42 are opened.

The connecting pipe 32 comprises a stainless steel pipe, for example. The connecting pipe 32 has at its proximal end side (right-hand side in FIG. 2) such a small diameter as to be fitted into the mounting hole 48. An O-ring 51 is attached to the proximal end of the connecting pipe 32. At the distal end side, the diameter of the connecting pipe 32 is gradually increased to such an extent that supply opening C of the pack B is fitted into the pipe. An inner circumferential face of the connecting pipe 32 is coated with a fluorine-contained resin such as Teflon.

The mounting structure of the connecting pipe 32 will now be described. A pair of screw holes 53 are formed in right and left open edges of the hole 47 of the boss 45, respectively, as shown in FIG. 4. Two pins 55 are screwed into the screw holes 53, respectively. Each pin 55 includes a head 56 formed at a distal end thereof and a collar 57 spaced from the head. A portion of each pin 55 between the head 56 and the collar 57 serves as a mounting groove 58. Each pin 55 has a male thread 59 at the distal end side thereof The male thread 59 of each pin 55 is screwed into the corresponding screw hole 53 until the collar 57 strikes the open edge of the hole 47. The collar 57 prevents each pin 55 from being excessively screwed.

Figure 5:
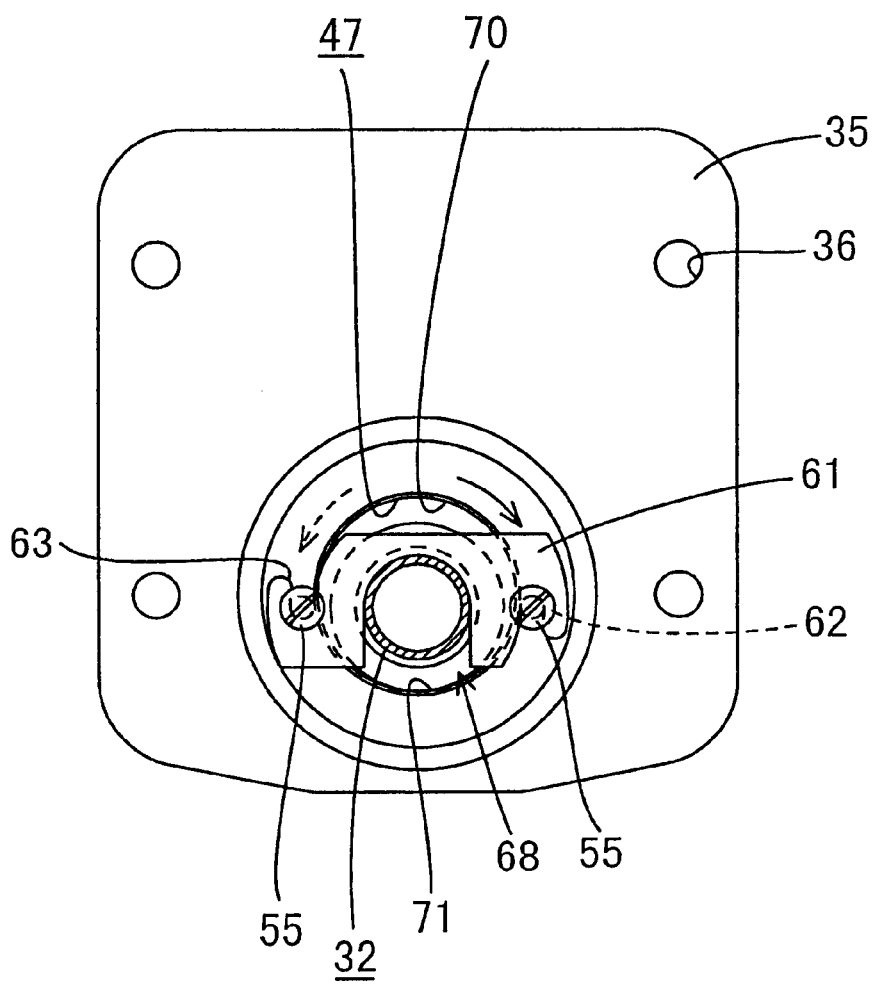
FIG. 5 is a partially cut-away rear view of a dispensing section to which a connecting pipe is assembled.
Figure 6:
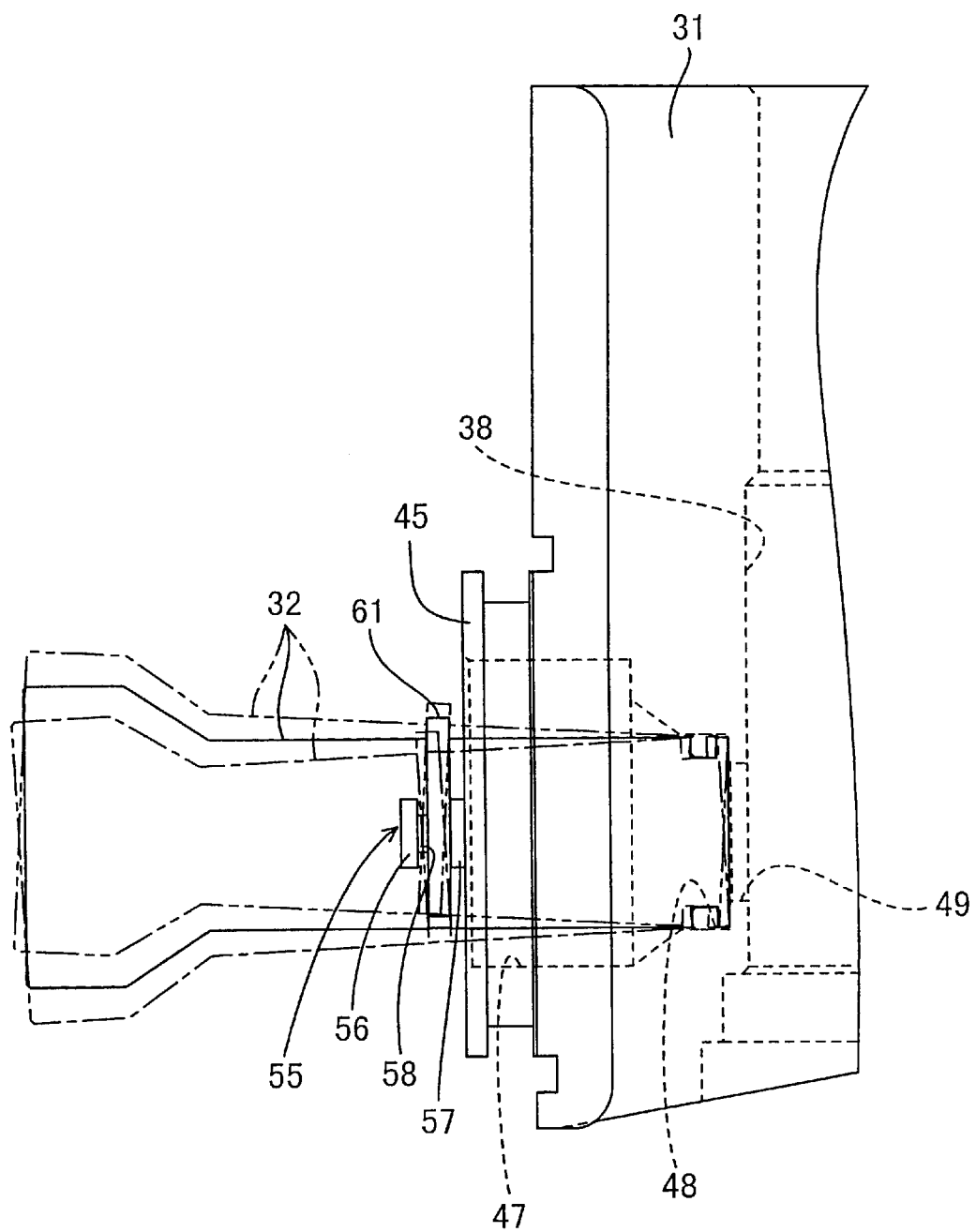
FIG. 6 is a side view of the dispensing mechanism.

The connecting pipe 32 has a circumferential groove 60 located slightly near its proximal end from the lengthwise middle thereof A partition plate 61 is fitted in the groove 60 to be welded as shown in FIG. 4. The partition plate 61 is slender and has right-hand and left-hand ends placed on the open edge of the hole 47 as shown in FIG. 5. The partition plate 61 has two engagement holes 62 formed in the right-hand and left-hand ends thereof so as to be fitted into the mounting grooves 58 of the pins 55, respectively. Each engagement hole 62 has a guide groove 63 located clockwise forward as viewed in FIG. 5 in order that the mounting groove may be fitted with the hole 62 sidewise. The mounting groove 58 of each pin 55 has a width set to be larger than a thickness of the partition plate 61 as shown in FIG. 6.

The operation of the ice cream dispenser will be described. First, the connecting pipe 32 is attached to the dispensing section 31. In this case, the connecting pipe 32, assuming the position as shown in FIG. 5, is rotated counterclockwise, and the proximal end thereof is inserted into the mounting hole 48 of the dispensing section 31. When the connecting pipe 32 is then rotated clockwise as shown by solid line in FIG. 5, the mounting groove 58 of each pin 55 passes through the guide groove 63, fitting into the engagement hole 62. As a result, the connecting pipe 32 is prevented from falling off. The partition plate 61 is fitted in the mounting groove 58 of each pin 55 with clearance as shown by solid line in FIG. 6. Further, a clearance corresponding at least to the thickness of the collar 57 is defined between the rear side of the partition plate 61 and the surface of the boss 45. Additionally, a generally annular blowing space 68 is defined between the outer circumference of the proximal end side of the connecting pipe 32 as shown in FIG. 2. The partition plate 61 is elongate and accordingly, an inlet 70 and an outlet 71 for cold air are defined over and below the partition plate 61 respectively as shown in FIG. 5. The inlet 70 has a larger opening area than the outlet 71 since the partition plate 61 is eccentric downward.

Figure 7:
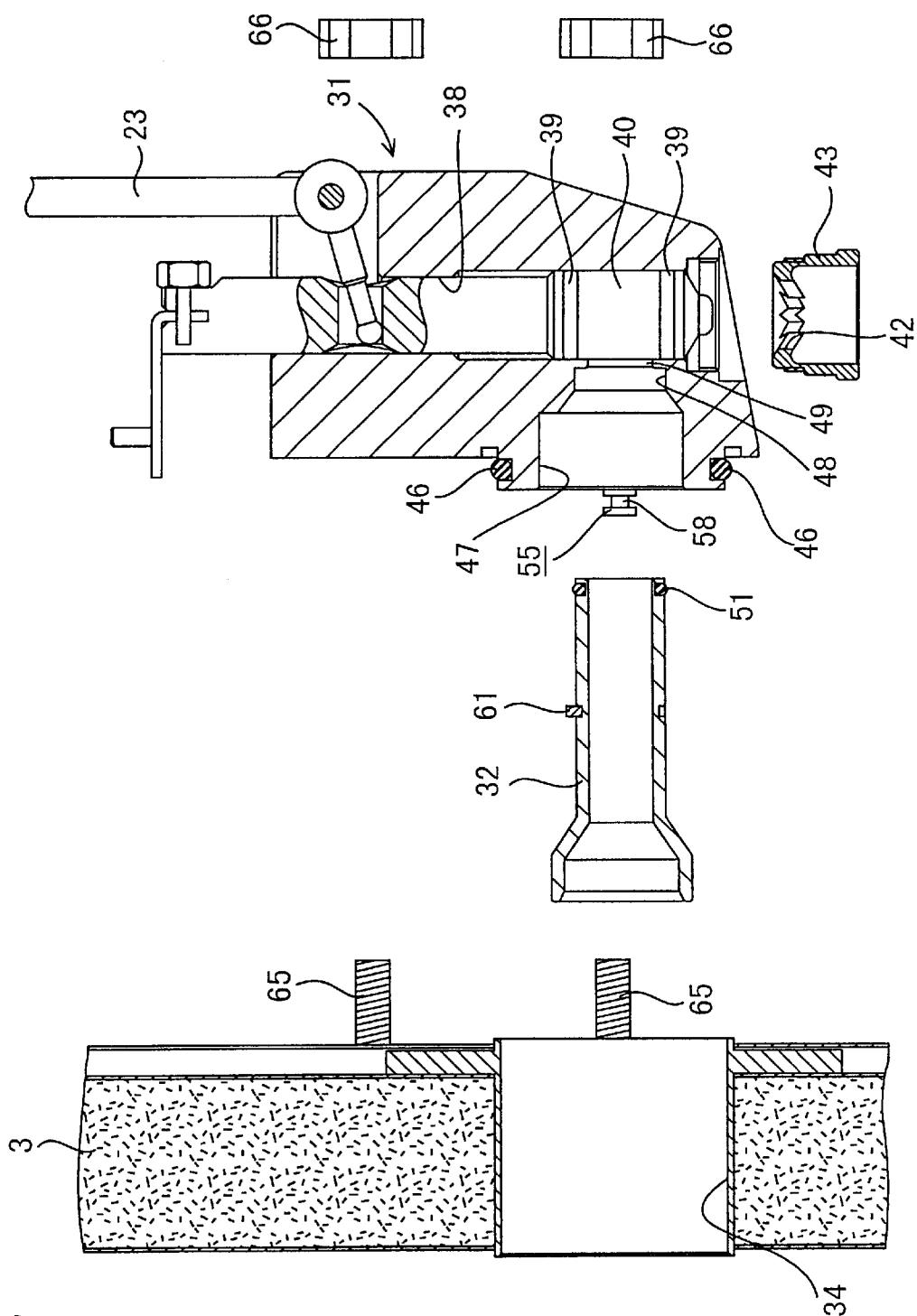
FIG. 7 is an exploded section of the dispensing mechanism.

The dispensing section 31 is mounted on the outer face of the heat-insulated door 3 after the connecting pipe 32 has been connected to the dispensing section. Four screws 65 protruding from the outer face of the door 3 as shown in FIG. 7 are inserted through the insertion holes 36 formed in through the corners of the mounting plate 35 of the dispensing section 31. Decorative nuts 66 are engaged with the respective protruding ends of the screws 65 to be tightened. As a result, the mounting plate 35 is pressed against the outer face of the door 3 such that the dispensing section 31 is mounted on the door. At this time, the boss 45 is tightly fitted in the hole 34 of the door 3 with the O-ring 46 being interposed therebetween as shown in FIG. 2. Further, the distal end side of the connecting pipe 32 extends through the hole 34 with sufficient clearance, protruding slightly into the freezing compartment 2.

The pack B of ice cream is accommodated in the pack-accommodating chamber 16 while the dispensing cylinder 12 is inclined. Thereafter, the cylinder 12 is raised to stand. The supply opening C of the pack B is then fitted into the spread distal end of the connecting pipe 32 to be connected to the pipe as shown in FIG. 2. In this case, the partition plate 61 of the connecting pipe 32 is fitted in the mounting groove 58 of each pin 55 with the clearance. Accordingly, even if the supply opening C and the pipe 32 are shifted from each other, the pipe is swung up and down as shown by chain lines in FIG. 6 such that the shift is absorbed. Further, the partition plate 61 has the clearance between it and the surface of the boss 45 due to the presence of collar 57 of each pin 55. Accordingly, the partition plate 61 is prevented from striking the boss 45 even when the connecting pipe 32 is swung. Thus, when the supply opening C of the pack B is connected to the pipe 32, an excessive load is not applied to the mounting portion of the pipe 32 to the dispensing section 31 or the mounting portion of the dispensing section to the door 3. Consequently, the supply opening C can smoothly be connected to the pipe 32.

When the ice cream A is dispensed, a container (not shown) is put below the dispensing port 42 and the cock 23 is opened. Then, the communicating port 49 is opened as shown in FIG. 3. Further, the dispensing switch 29 is turned on so that the pump 27 is driven in the normal direction. As a result, when the brine X is fed from the tank 25 into the pressure chamber 17 of the dispensing cylinder 12 to be pressurized, the piston 13 moves upward such that the pack B is compressed. Consequently, the ice cream A is fed out of the supply opening C of the pack B, being dispensed through the pipe 32, the communicating port 49, the lower end of the dispensing passage 38 and the dispensing port 42 into the container. When a suitable amount of ice cream A is dispensed, the cock 23 is closed. Then, the dispensing switch 29 is turned off to stop the pump 27. Further, the communicating port 49 and the dispensing port 42 are closed such that the dispensing is stopped. The above-described operation is repeated so that the ice cream A is dispensed sequentially.

The fluorine-contained resin is coated on the inner surface of the connecting pipe 32. Accordingly, when the ice cream A is dispensed, frictional resistance is reduced such that the ice cream A can smoothly be fed through the connecting pipe 32. Furthermore, the ice cream A remains in the connecting pipe 32 every time it is dispensed. In the embodiment, however, the blowing space 68 is defined between the outer circumference of the proximal end side of the connecting pipe 32. Further, the partition plate 61 provides the cold air inlet 70 and outlet 71. As a result, part of cold air circulated by the fan 9 is caused to flow into the hole 34 of the door 3. The cold air flows through the inlet 70 into the upper side of the blowing space 68 as shown by arrows in FIG. 2. The cold air then flows into the lower side, returning through the outlet 71 into the freezing chamber 2. Thus, part of cold air in the freezing compartment 2 is supplied around the connecting pipe 32, and the remaining ice cream A can sufficiently be cooled such that the increase in the temperature of the ice cream can reliably be prevented.

When the interior of the dispensing section 31 is cleaned, the decorative nut 66 is removed and the dispensing section is pulled outward. The dispensing section 31 is then detached together with the connecting pipe 32. Thereafter, when the pipe 32 is turned counterclockwise as shown by chain line arrow in FIG. 5, the engagement holes 62 are pulled out of the mounting grooves 58 of the pins 55, respectively. Accordingly, the connecting pipe 32 is successively pulled out against the friction of the O-ring 51. As a result, the pipe 32 is detached from the dispensing section 31 as shown in FIG. 7.

When the dispensing section 31 side is cleaned, the cap 43 is detached and the valve element 40 is raised. The inside of the dispensing passage 38 is then cleaned with water. The inside of the connecting pipe 32 is also cleaned with water. The ice cream A tends to remain in part of the deep inside of the dispensing section 32 near the communicating port 49. The part is opened to the outside when the connecting pipe 32 is detached. Further, the part is located near the lower end of the dispensing section 31 when the cap 43 is detached. Consequently, the part can be cleaned with fingers or cloth easily and reliably. Upon completion of the cleaning, the connecting pipe 32 and other parts are assembled in the above-described manner.

According to the foregoing embodiment, the connecting pipe 32 is detachable from the mounting hole 48 of the dispensing section 31. The pipe 32 is detached so that the dispensing section 31 and the pipe can be cleaned separately from each other. Moreover, the communicating hole 49 through which the pipe 32 communicates with the dispensing section 31 is opened to the outside when the pipe 32 is detached from the dispensing section. Consequently, the dispensing route can be cleaned easily and sufficiently over the whole length and breadth thereof.

Figure 8:
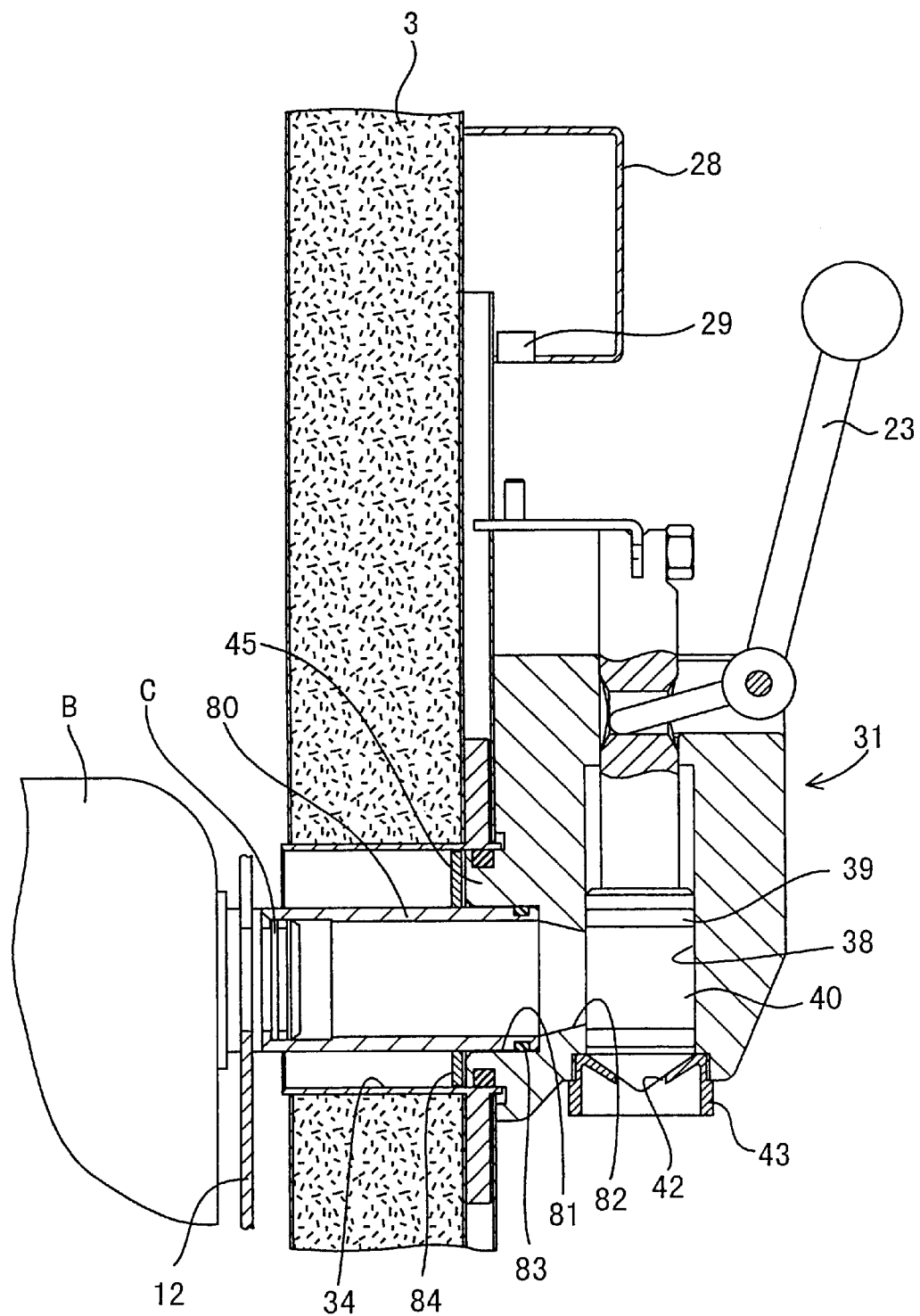
FIG. 8 is an enlarged section of an ice cream dispenser of a second embodiment in accordance with the invention.
Figure 9:
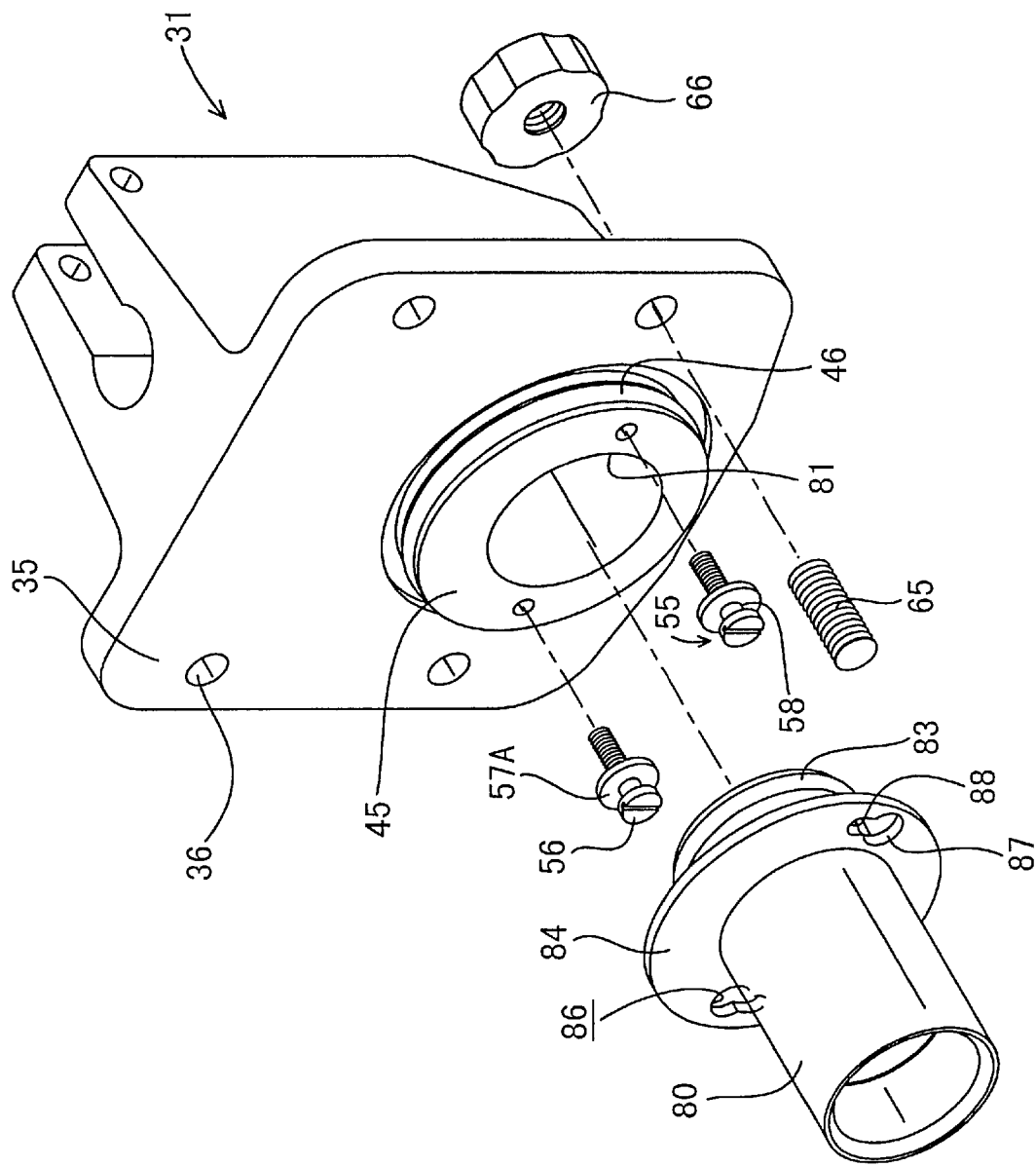
FIG. 9 is an exploded perspective view of a dispensing mechanism of the second embodiment.
Figure 10:
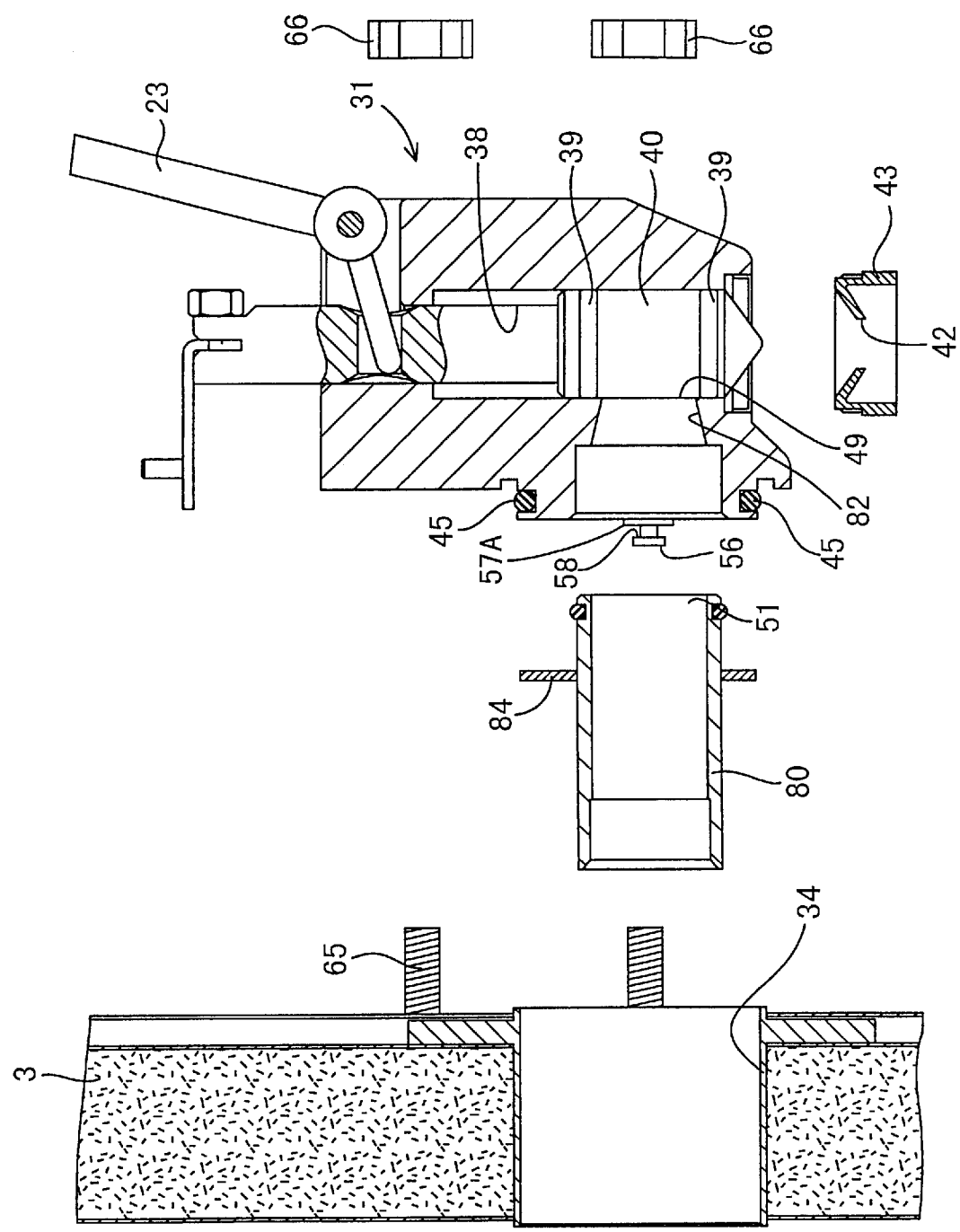
FIG. 10 is an exploded section of the dispensing mechanism.

FIGS. 8 to 10 illustrate a second embodiment of the invention. Only the difference between the first and second embodiments will be described. Identical or similar parts in the second embodiment are labeled by the same reference symbols as in the first embodiment. In the second embodiment, the boss 45 formed on the front of the dispensing section 31 has a mounting hole 81 which is eccentric slightly downward and into which the connecting pipe 80 is fitted. The mounting hole 81 has a communicating port 82 formed in the inner part thereof. The port 82 has a gradually reduced inner diameter. The mounting hole 81 and accordingly the connecting pipe 80 communicate via the port 82 with the lower end side of the dispensing passage 38.

The diameter of the connecting pipe 80 is substantially the same over the whole length. The distal end side (the right-hand side as viewed in FIG. 8) of the pipe 80 is fitted in the mounting hole 81 of the dispensing section 31. The supply opening C of the pack B is fitted in the protruding end side (the left-hand side as viewed in FIG. 8) of the pipe 80. The inner surface of the pipe 80 is coated with the fluorine-contained resin layer. An O-ring 83 is attached to the proximal end side of the pipe 80. Further, a flange 84 is formed on the outer circumference of the proximal end side of the pipe 80 so as to be opposed to the opening edge of the mounting hole 81. The pins 55 stand from the opening edge of the mounting hole 81 as shown in FIG. 9. Each pin 55 has a collar 57A larger than the head 56. The flange 84 of the pipe 80 has a pair of right-hand and left-hand engagement holes 86. Each hole 86 includes a large diameter portion 87 through which the head 56 of the pin 55 is inserted and a small diameter portion 88 communicating with the clockwise backside of the large diameter portion 87 and fitted with the mounting groove 58. Each mounting groove 58 has a width larger than the thickness of the flange 84.

When the connecting pipe 80 is assembled to the dispensing section 31, the large diameter portions 87 of the engagement holes 86 are firstly positioned to correspond to the heads 56 of the pins 55, respectively. The proximal end side of the pipe 80 is then inserted into the mounting hole 81 of the dispensing section 31. When the large diameter portions 87 pass the heads 56 of the pins 55 to strike the collars 57A, the insertion of the pipe 80 is stopped and then the pipe 80 is turned clockwise. The small diameter portions 88 of the engagement holes 86 are fitted into the mounting grooves 58 of the pins 55, respectively, such that the pipe is mounted on the dispensing section 31 so as to be prevented from falling off. In this case, the O-ring 83 seals a gap between the outer circumference of the proximal end of the pipe 80 and the inner circumference of the mounting hole 81. The dispensing section 31 to which the connecting pipe 80 is assembled is mounted on the outer surface side of the heat-insulated door 3 in the same manner as in the first embodiment. The remaining construction of the ice cream dispenser of the second embodiment is the same as of the first embodiment.

When the supply opening C of the pack B is connected to the pipe 80, the connecting pipe 80 is swung up and down such that the shift is absorbed, whereupon an excessive load is not applied to the mounting portion of the pipe 80 or the like. Consequently, the supply opening C can smoothly be connected to the pipe 80. Further, since the inner surface of the pipe 80 is coated with the fluorine-contained resin layer, the frictional resistance is reduced in the dispensing operation such that the ice cream A can smoothly be fed through the connecting pipe 80.

When the inside of the dispensing section 31 is cleaned, the decorative nut 66 is disengaged so that the dispensing section 31 is detached from the door 3 together with the pipe 80. When the pipe 80 is turned counterclockwise, the large diameter portions 87 of the engagement holes 86 are located to correspond to the heads 56 of the pins 55, respectively. The pipe 80 is successively pulled out against the friction of the O-ring 83, so that the pipe 80 is detached from the dispensing section 31. Thereafter, when the valve element 40 is raised and the cap 43 is detached, the inside of the dispensing passage 38 is then cleaned with water. The inside of the connecting pipe 80 is also cleaned with water. The dispensing section 31 and the pipe 80 can be cleaned with water separately from each other. Moreover, the communicating port 49 is opened to the outside when the pipe 80 is detached from the dispensing section 31. As a result, the dispensing section 31 and the pipe 80 can be cleaned easily and reliably.

Figure 11:
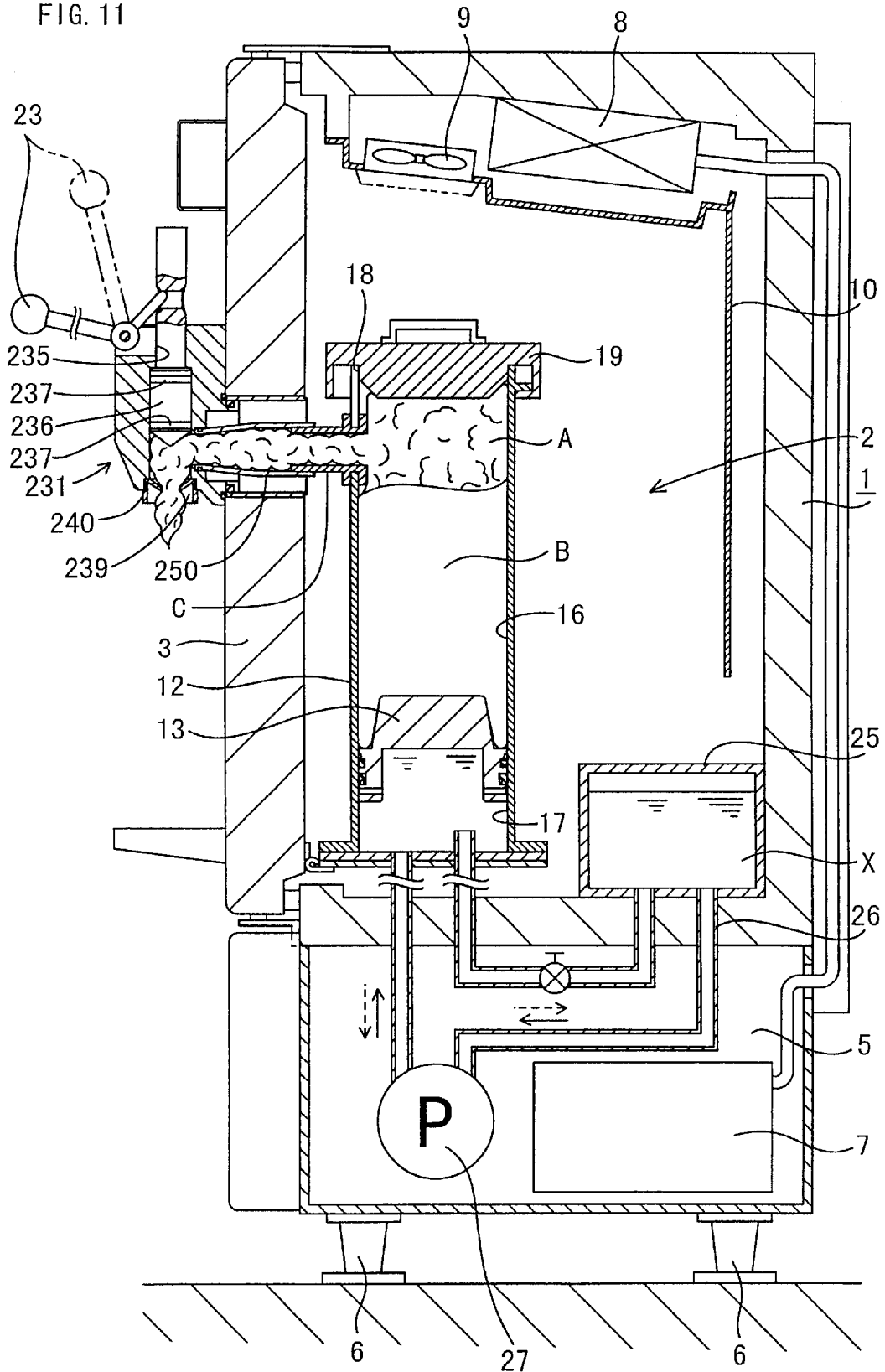
FIG. 11 is a longitudinally sectional view of an ice cream dispenser of a third embodiment in accordance with the present invention.
Figure 12:
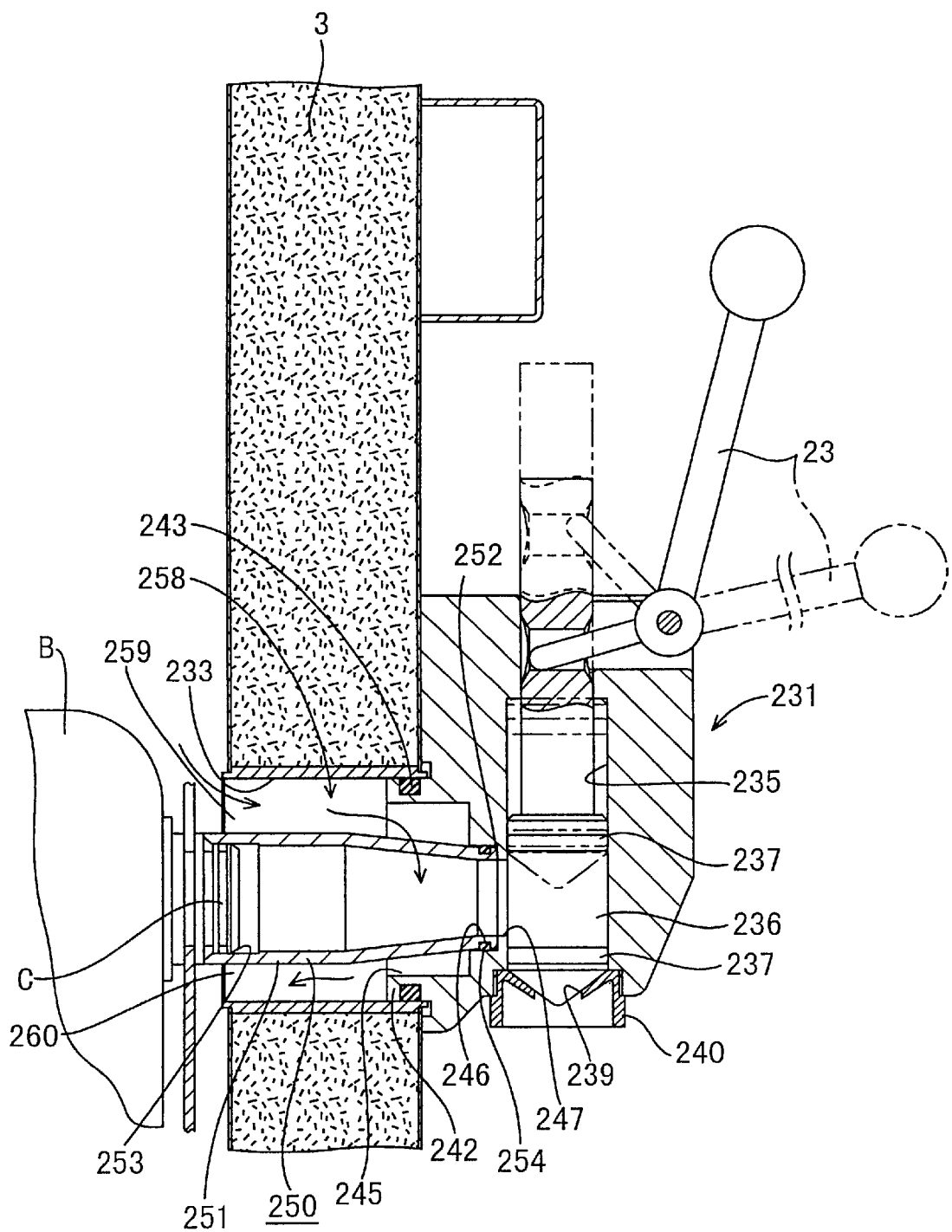
FIG. 12 is an enlarged section of a dispensing mechanism of the third embodiment.

FIGS. 11 and 12 illustrate a third embodiment of the invention. Only the difference between the first and third embodiments will be described. The third embodiment differs from the first embodiment in the dispensing section. The connecting pipe 250 horizontally protrudes from the backside of the dispensing section 231. The pipe 250 extends through the heat-insulated door 3, protruding slightly into the freezing compartment 2. The supply opening C of the pack B of ice cream A is connected to the protruding end of the pipe 250. The door 3 has a through hole 233 formed to correspond to the location of the dispensing section 231 thereon. The dispensing section 231 is made of a synthetic resin into the shape of a block. The dispensing section 231 has a vertically extending dispensing passage 235 formed in the central interior thereof. A valve element 236 is tightly fitted in the dispensing passage 235 so as to be vertically moved. Two O-rings 237 are attached to upper and lower portions of the valve element 236, respectively. The valve element 236 is connected to the cock 23 rotatably mounted on an outer upper portion of the dispensing section 231. A cap 240 provided with a dispensing port 239 is screwed to a lower end of the dispensing passage 235.

An annular boss 242 is formed on a lower portion of the rear of the dispensing section 231 so as to slightly protrude. An O-ring 243 is attached to an outer circumference of the boss 242. The boss 242 is air tightly fitted in the hole 233 when the dispensing section 231 is mounted on the heat insulated door 3. The boss 242 has a central circular hole 245 and a mounting hole 246 formed deep in the hole 245 so as to be slightly downward eccentric relative thereto. The hole 246 has a diameter gradually reduced for the mounting of the connecting pipe 250. The hole 246 has a stepped communicating port 247 formed deep therein and having a further reduced diameter. The mounting hole 246 communicates via the port 247 with the lower end side of the dispensing passage 235. When the cock 23 is moved to an upper position, the valve element 23 6 occupies a lowered position as shown by solid line in FIG. 11 such that the upper and lower O-rings 237 are located at upper and lower ends of the port 247, thereby closing the port. On the other hand, when the cock 23 is lowered, the valve element 236 is moved upward such that the lower O-ring 237 is raised above the port 247 as shown by chain line in FIG. 11. As a result, the port 247 is opened.

The connecting pipe 250 comprises a stainless steel pipe, for example, and is formed into a circular shape having substantially a uniform thickness over its whole length. The connecting pipe 250 has a proximal end 251 including about one half portion with an equal outer diameter and a distal connecting hole 253 into which the supply opening C of the pack B is fitted. The connecting hole 253 has an inner circumferential face slightly cut so as to have an increased inner diameter. The connecting hole 253 has a stepped portion serving as a stopper for the supply opening C. The proximal end 252 of the connecting pipe 250 has such a small diameter as to be fitted into the mounting hole 246 of the dispensing section 231. The proximal end 252 is continuous via a tapered portion with the above described distal end side. An O-ring 254 is attached to the proximal end 252 of the connecting pipe 250. The proximal end 252 with a small diameter is tightly fitted in the mounting hole 246 so that the connecting pipe 250 is mounted. Further, the distal end 251 of the connecting pipe 250 extends through the door 3, protruding slightly into the freezing compartment 2. A generally annular blowing space 258 is defined between the outer circumference of the connecting pipe 250 and inner circumferential faces of the hole 233 of the door 3 and the hole 245 of the dispensing section 231. The other construction in the third embodiment is the same as that in the first embodiment.

In the operation of the ice cream dispenser of the third embodiment, the pack B of ice cream A is accommodated in the pack-accommodating chamber 16 and the dispensing cylinder 12 is then raised. As a result, the supply opening C of the pack B is fitted into the connecting hole 253 of the connecting pipe 250 as shown in FIG. 12. When the ice cream A is dispensed, a container (not shown) is put below the dispensing port 239 and the cock 23 is opened. Then, the communicating port 247 is opened and the dispensing switch (not shown) is turned on so that the pump 27 is driven in the normal direction. As a result, when the brine X is fed from the tank 25 into the pressure chamber 17 of the dispensing cylinder 12 to be pressurized, the piston 13 moves upward such that the pack B is compressed. Consequently, the ice cream A is fed out of the supply opening C of the pack B, being dispensed through the pipe 250, the communicating port 247, the lower end of the dispensing passage 235 and the dispensing port 239 into the container. When a suitable amount of ice cream A is dispensed, the cock 23 is closed. Then, the dispensing switch 29 is turned off to stop the pump 27. Further, the communicating port 247 and the dispensing port 239 are closed such that the dispensing is stopped. The above-described operation is repeated so that the ice cream A is dispensed sequentially.

The ice cream A remains in the connecting pipe 250 when the dispensing has been completed. However, the outer diameter of the proximal end 252 side of the connecting pipe 250 is gradually reduced. Accordingly, an amount of ice cream A remaining in the connecting pipe 250 is reduced as compared with the case where the connecting pipe has a uniform diameter over its whole length. Further, since the blowing space 258 open to the freezing compartment is defined around the pipe 250, part of cold air circulated through the freezing compartment is caused to flow through the inlet 259 into the upper side of the blowing space 258 as shown by arrows in FIG. 12. The cold air then flows into the lower side, returning through the outlet 260 into the freezing compartment 2. Since the atmosphere in the pipe 250 is cooled by the cold air, the increase in the temperature of the ice cream A in the pipe 250 can be limited.

As the ice cream A remaining in the pipe 250 comes near to the dispensing section 231 side or proximal end 252 side, it tends to be subjected to more outside heat such that the temperature of the ice cream is increased. In the embodiment, however, the diameter of the proximal end 252 side is smaller than that of the compartment interior side thereof or the diameter thereof is gradually reduced deep inside. Accordingly, the distance from the outer surface of the pipe 250 to the center of the pipe is rendered shorter as compared with the case where the diameter of the proximal end 252 side is equal to that of the compartment interior side thereof. Consequently, the atmosphere in the pipe can sufficiently be cooled.

Figure 22:
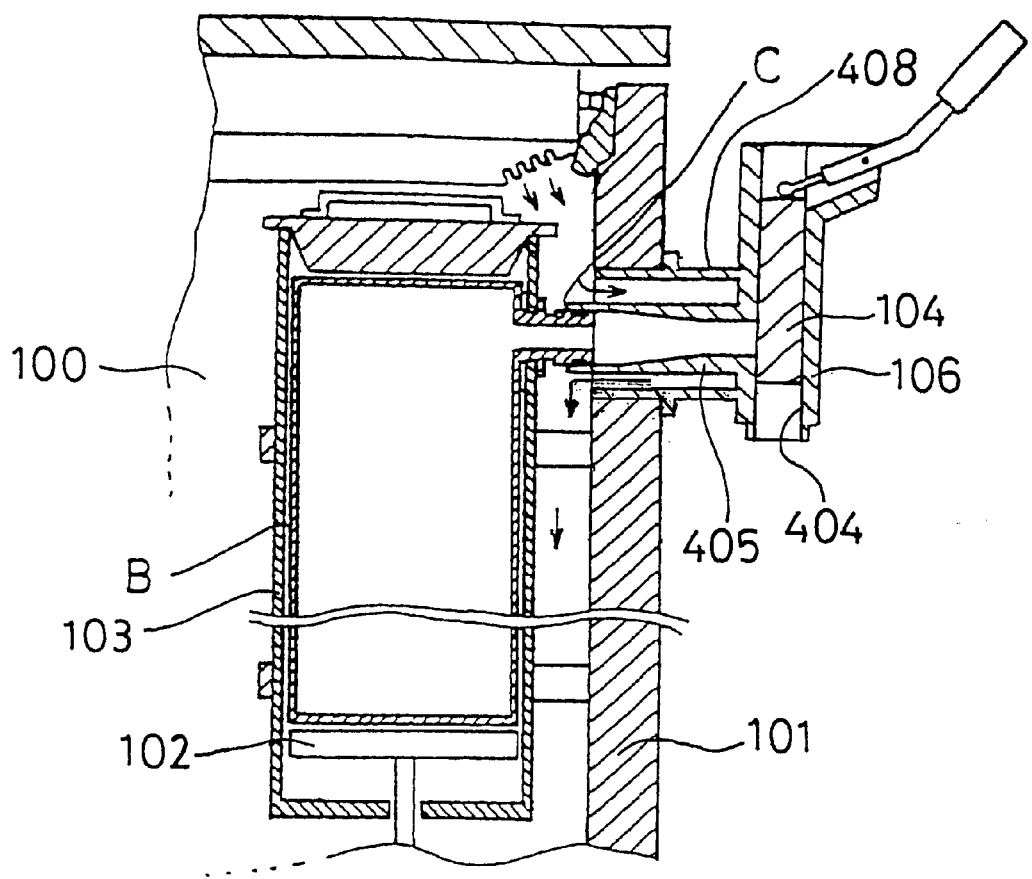
FIG. 22 is a schematic sectional view of another conventional ice cream dispenser.

FIG. 22 shows a conventional ice cream dispenser constructed to reduce an amount of ice cream remaining in the connecting pipe when the dispensing is stopped. In this construction, an inner pipe 405 constructed into a double pipe is provided in the dispensing section 106. The inner pipe 405 has a distal end to which the supply opening C of the pack B is connected. An inner diameter of the portion of the inner pipe 405 at the dispensing passage 404 side is reduced so that an amount of ice cream remaining in the connecting pipe is reduced. Further, the inner pipe 405 has a double pipe structure so that the cold air is supplied around the inner pipe to cool the atmosphere in the pipe.

However, the thickness of the circumferential wall is increased since the inner diameter of the portion of the inner pipe 405 at the dispensing passage 404 side is reduced.

Accordingly, the cooling efficiency is reduced at the side of the inner pipe 405 tending to be subjected to outside heat, namely, at the dispensing passage 404 side. When an amount of cold air supplied around the inner pipe 405 is increased, the atmosphere at the outer pipe 408 side is also cooled, whereupon dew condensation easily occurs.

According to the third embodiment, however, an amount of ice cream A remaining in the pipe 250 can be reduced by a simple structure in which the outer diameter of the pipe 250 is gradually reduced toward the dispensing section 231 side. Further, the atmosphere in the pipe 250 can efficiently be cooled over the whole length thereof. Consequently, an increase in the temperature of the ice cream remaining in the pipe 250 can effectively be prevented. Furthermore, since an amount of cold air fed into the blowing space 258 can be reduced, the dispensing section 231 can be prevented from being excessively cooled such that the dew condenses on the surface thereof.

Figure 13:
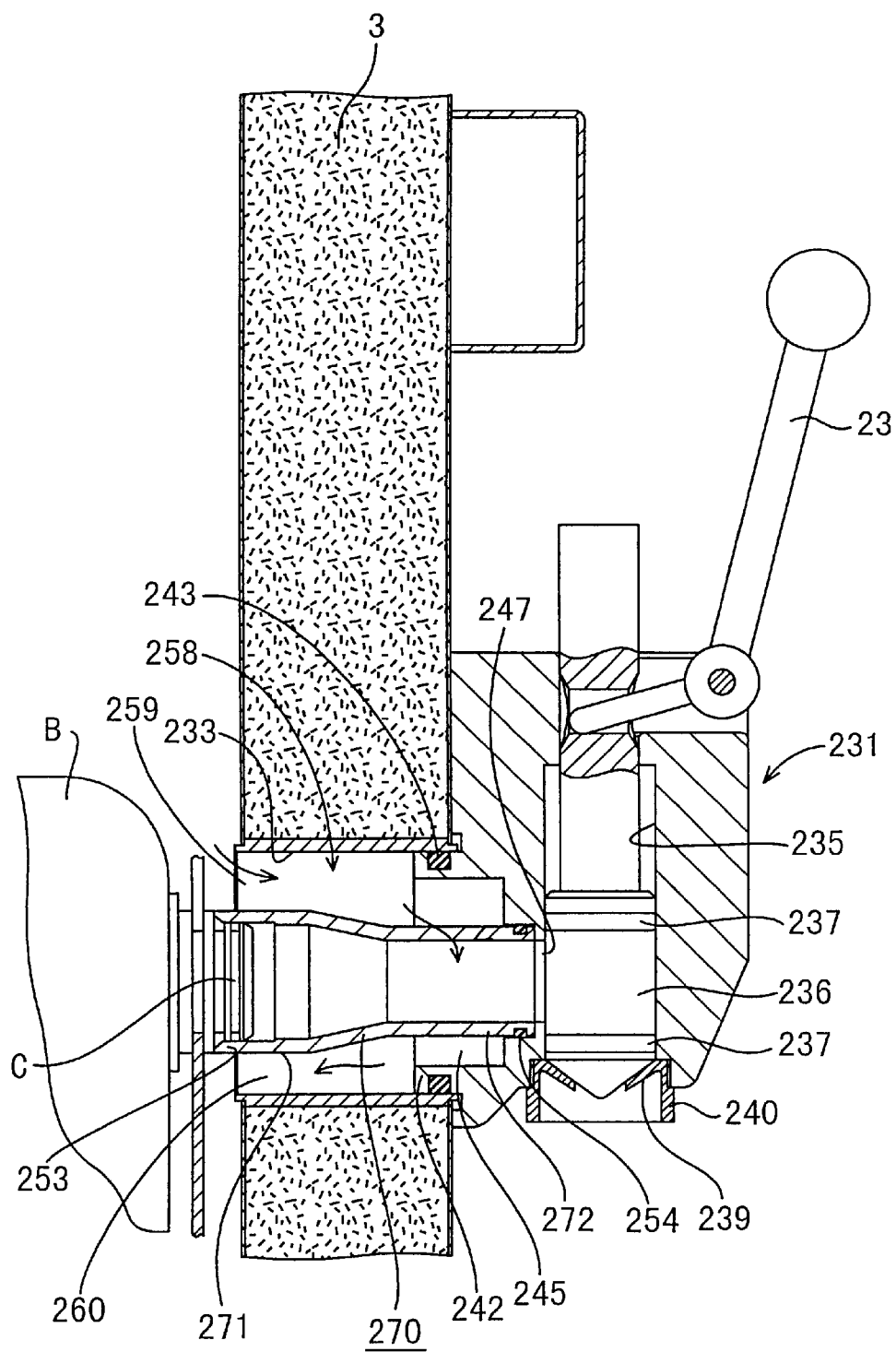
FIG. 13 is an enlarged section of a dispensing mechanism employed in an ice cream dispenser of a fourth embodiment in accordance with the invention.

FIG. 13 illustrates a fourth embodiment of the invention. The fourth embodiment is directed to an improvement in the shape of the connecting pipe 270. More specifically, the connecting pipe 270 includes a proximal end 272 having a small diameter and a length which is about one half of the whole length of the pipe 270 and a distal end 271 having a large diameter and a short length. The remaining construction of the fourth embodiment is the same as that in the third embodiment. According to the fourth embodiment, the amount of ice cream remaining in the pipe 270 can be reduced since the pipe has a longer small-diameter portion. Furthermore, the cooling efficiency can also be improved.

Figure 14:
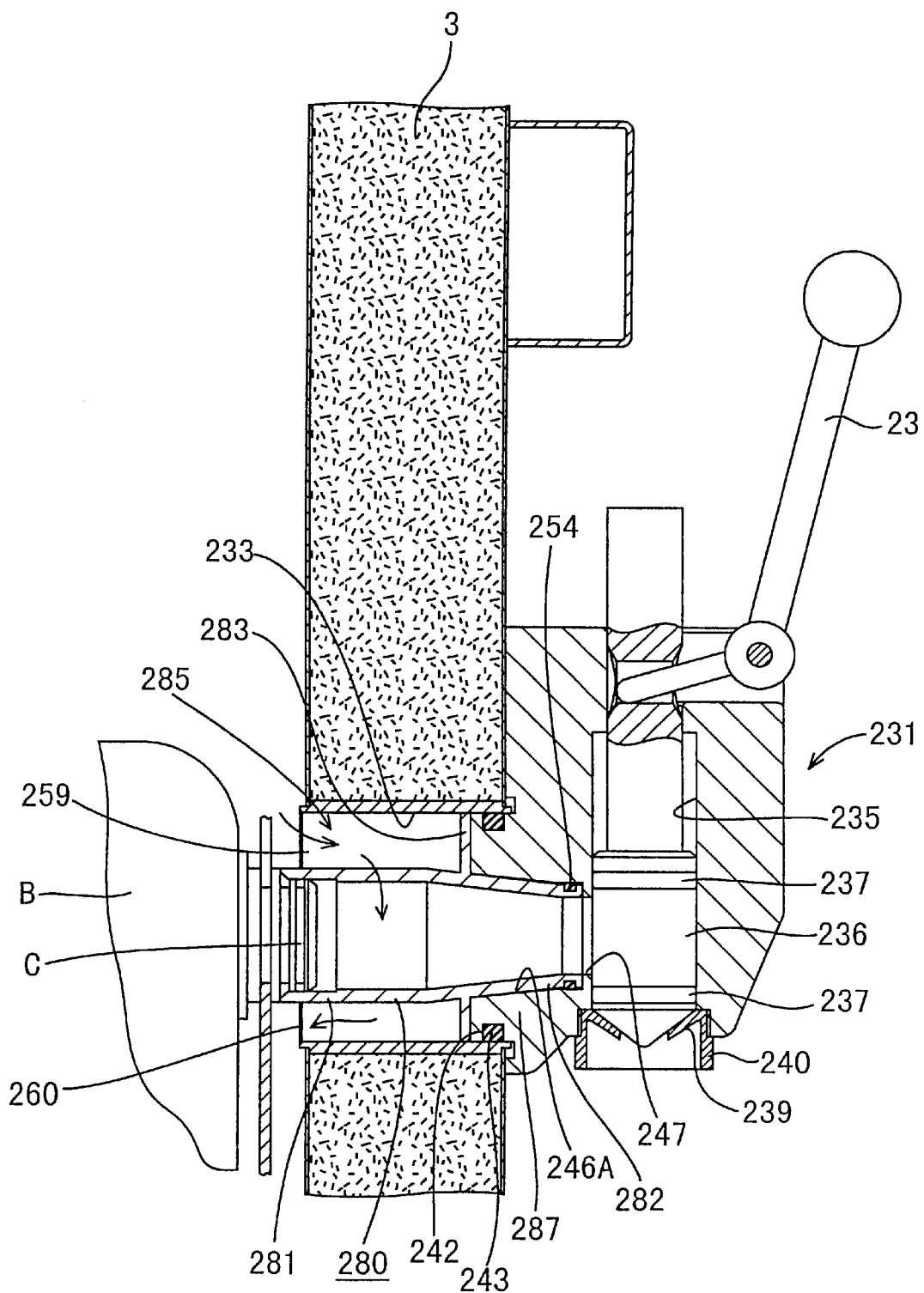
FIG. 14 is an enlarged section of a dispensing mechanism employed in an ice cream dispenser of a fifth embodiment in accordance with the invention.

FIG. 14 illustrates a fifth embodiment of the invention. The dispensing section 231 includes a mounting hole 246A slightly downward eccentric with respect to the boss 242. The mounting hole 246A has a diameter gradually reduced toward its depth. A communicating hole 247 is formed deep inside the mounting hole 246A. The communicating hole 247 is stepped such that the diameter thereof is reduced. The connecting pipe 280 communicates via the communicating hole 247 with the lower end side of the dispensing passage 235.

The connecting pipe 280 has a large diameter portion at a distal end 281 side. The portion extends over about one half of the length of the connecting pipe 280. The connecting pipe 280 has another portion located at a proximal end 282 side and having a gradually reduced diameter in correspondence with the inner surface of the mounting hole 246A. The connecting pipe 280 further has a flange 283 formed on the outer circumference of the reduced diameter portion thereof. In mounting on the dispensing section 231, the connecting pipe 280 is pushed until the flange 283 strikes the surface of the boss 242. As a result, the blowing space 285 is defined only around the distal end 281 of the connecting pipe 280. The remaining construction in the fifth embodiment is the same as that in the third embodiment.

The amount of ice cream A remaining in the connecting pipe 280 is also reduced in the fifth embodiment since the outer diameter of the portion of the pipe at the proximal end 282 side is reduced. Furthermore, the cold air is supplied into the blowing space 285 around the connecting pipe 280 so that the atmosphere in the pipe 280 is cooled. The proximal end 282 side of the pipe 280 is embedded in the dispensing section 231 so that the outer surface of the proximal end 282 side is not directly subjected to the cold air. However, since the distal end 281 side of the pipe 280 is cooled by the cold air supplied into the blowing space 285, the resultant cold is transferred to the circumferential wall of the pipe 280 at the proximal end 282 side. Consequently, the atmosphere in the pipe 280 is cooled. Furthermore, the outer diameter of the proximal end side 282 is gradually reduced such that the distance from the circumferential wall to the center of the pipe 280 is reduced. Consequently, the atmosphere in the pipe can efficiently be cooled. Additionally, since the portion of the pipe 280 at the proximal end 282 side has a reduced outer diameter, the thickness of a wall 287 of the dispensing section 231 around the portion is increased accordingly, whereupon the wall 287 has an improved heat insulation against external heat. As a result, the atmosphere in the connecting pipe 280 can efficiently be cooled over its whole length.

In the foregoing embodiments, the blowing space is defined around the connecting pipe so that cold air in the freezing compartment is supplied thereinto. However, the connecting pipe may be cooled by heat transfer from the interior of the freezing compartment without provision of the blowing space, instead. In this case, a closed space serving as a heat-insulating space may be defined around the connecting pipe, or the outer circumference of the pipe may directly be covered with a heat-insulating material.

Figure 15:
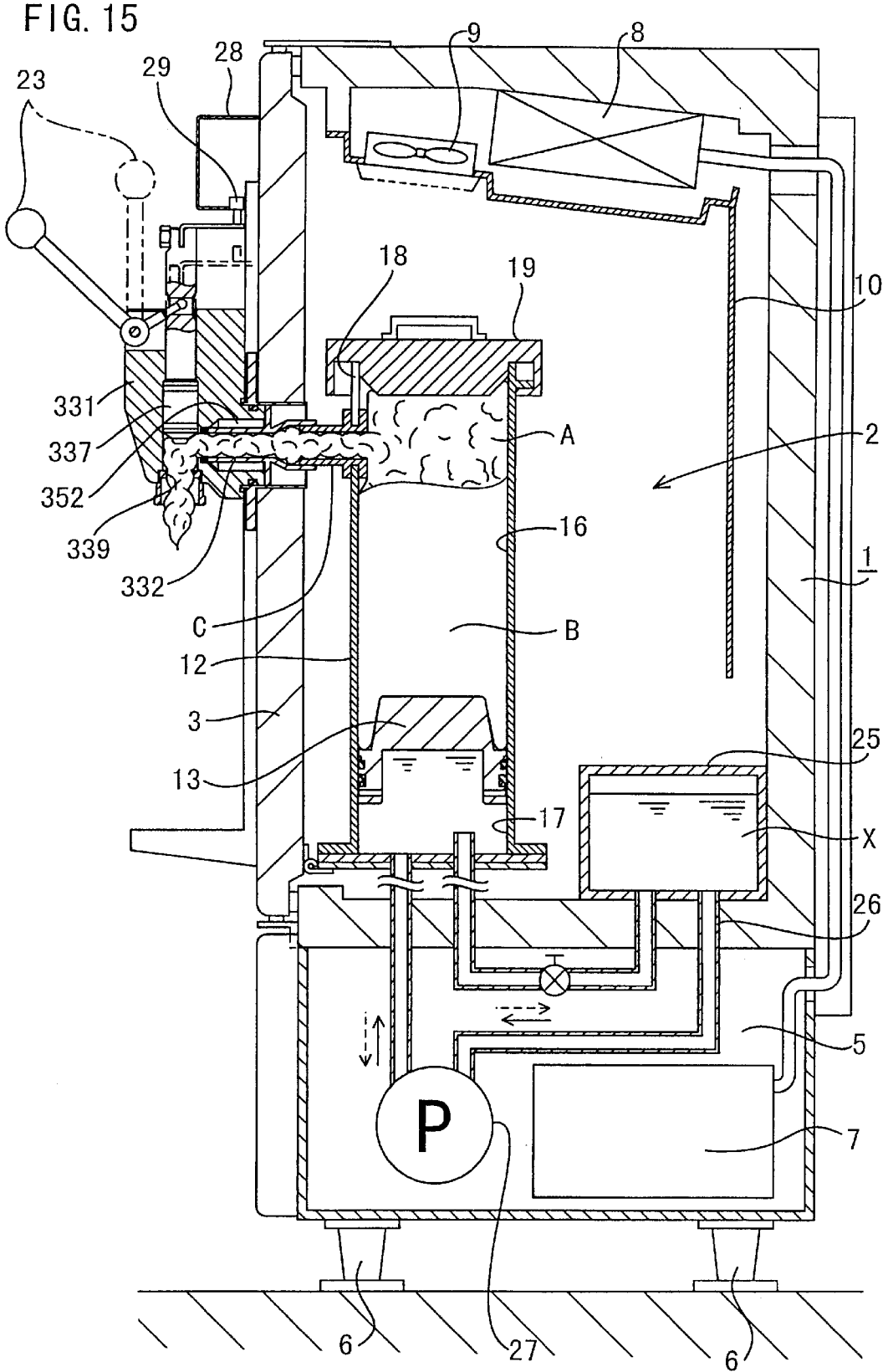
FIG. 15 is a longitudinally sectional view of an ice cream dispenser of a sixth embodiment in accordance with the present invention.
Figure 16:
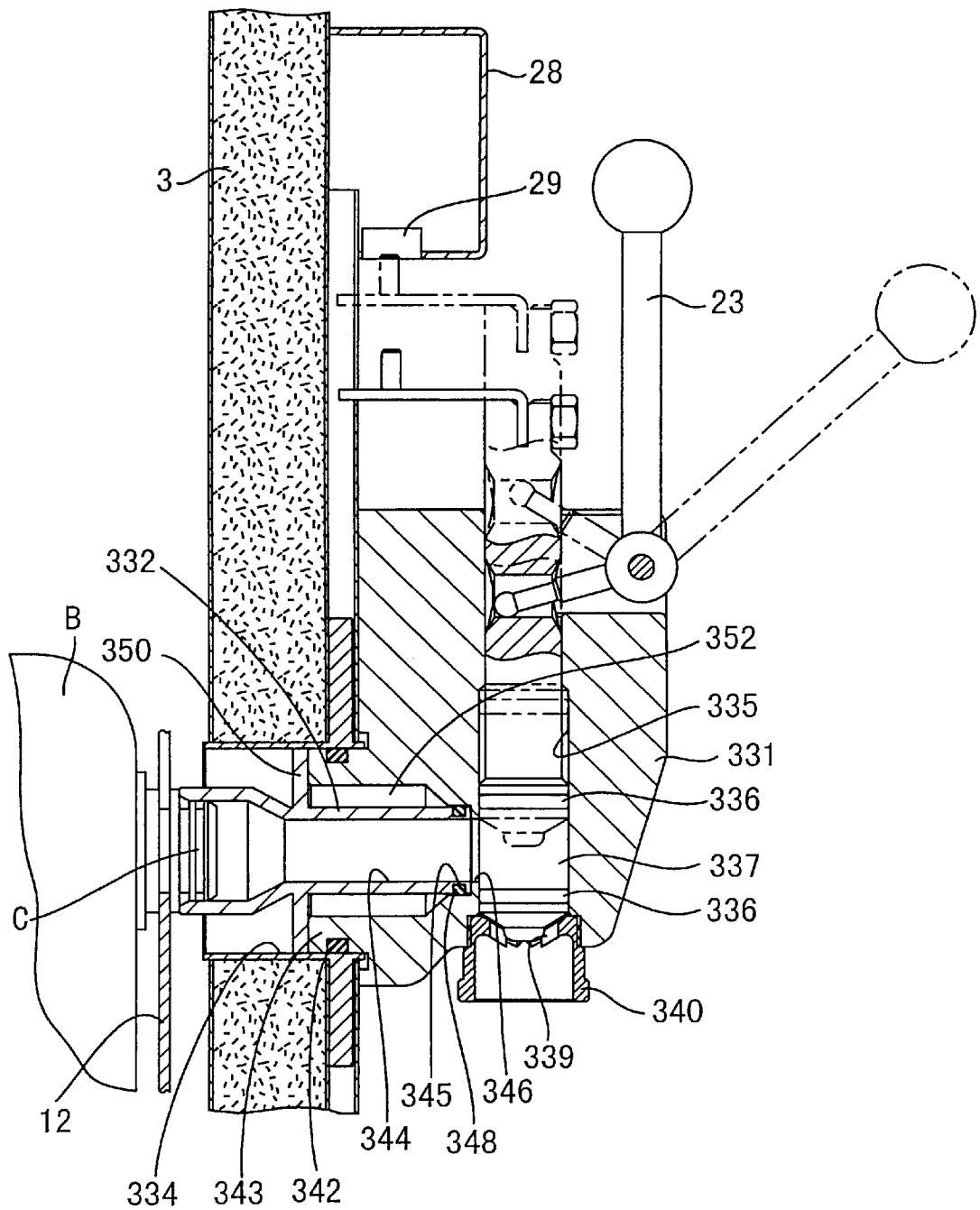
FIG. 16 is a longitudinal section of a dispensing mechanism of the sixth embodiment.

FIGS. 15 and 16 illustrate a sixth embodiment of the invention. Only the difference between the first and sixth embodiments will be described. The sixth embodiment differs from the first embodiment in the dispensing section. The connecting pipe 332 horizontally protrudes from the backside of the dispensing section 331. The pipe 332 extends through the heat-insulated door 3, protruding slightly into the freezing compartment 2. The supply opening C of the pack B of ice cream A is connected to the protruding end of the pipe 332. The door 3 has a through hole 334 formed to correspond to the location of the dispensing section 331 thereon. The dispensing section 331 is made of a synthetic resin into the shape of a block and detachably mounted at the aforesaid location on the door 3 by screws or the like in the same manner as in the first embodiment. The dispensing section 331 has a vertically extending dispensing passage 335 formed in the central interior thereof. A valve element 337 is tightly fitted in the dispensing passage 335 so as to be vertically moved. Two O-rings 336 are attached to upper and lower portions of the valve element 337, respectively. The valve element 337 is connected to the cock 23 rotatably mounted on an outer upper portion of the dispensing section 331. A cap 340 provided with a dispensing port 339 is screwed to a lower end of the dispensing passage 335.

An annular boss 343 is formed on a lower portion of the rear of the dispensing section 331 so as to slightly protrude. An O-ring 342 is attached to an outer circumference of the boss 343. The boss 343 has a circular hole 344 and a mounting hole 345 formed deep in the hole 344 and tapered so as to have a reduced diameter. The hole 345 has a stepped communicating port 346 formed deep therein and having a further reduced diameter. The mounting hole 345 communicates via the port 346 with the lower end side of the dispensing passage 335.

The connecting pipe 332 comprises a stainless steel pipe, for example. The connecting pipe 332 is at its proximal end side (right-hand side in FIG. 16) fitted into the mounting hole 345. An O-ring 348 is attached to the proximal end of the connecting pipe 332. At the distal end side, the diameter of the connecting pipe 332 is gradually increased so that the supply opening C of the pack B is fitted into the pipe. The connecting pipe 332 has a flange 350 formed on the outer circumference thereof so as to closely abut the surface of the boss 343 of the dispensing section 331.

The proximal end of the connecting pipe 332 is air tightly fitted into the mounting hole 345 of the dispensing section 331 with the O-ring 348 being interposed between the outer circumference of the pipe and the inner circumference of the hole. At this time, the flange 350 closely abuts the surface of the boss 343, whereupon an annular closed heat-insulating space 352 is defined around the outer circumference of the pipe 332, more specifically, between the outer circumference of the pipe 332 located between the flange 350 and the O-ring 348 and the inner circumference of the hole 344. Thus, when the dispensing section 331 to which the connecting pipe 332 has been assembled is mounted on the surface of the heat-insulated door 3, the boss 343 is air tightly fitted into the through hole 334 of the door 3 with the O-ring 342 being interposed therebetween. Further, the distal end side of the pipe 332 extends through the hole 334 with clearance, protruding slightly into the freezing compartment 2. The other construction in the sixth embodiment is the same as that in the first embodiment.

The operation of the ice cream dispenser of the sixth embodiment will now be described. The pack B of ice cream is accommodated in the pack-accommodating chamber 16 while the dispensing cylinder 12 is inclined. Thereafter, when the cylinder 12 is raised to stand, the supply opening C of the pack B is then fitted into the distal end of the connecting pipe 332 to be connected to the pipe. When the ice cream A is dispensed, the container (not shown) is put below the dispensing port 339 and the cock 23 is opened. Then, the valve element 337 is moved to the upper position as shown by chain line in FIG. 16 such that the communicating port 346 is opened. Further, the dispensing switch 29 on the operation panel 28 is turned on so that the pump 27 is driven in the normal direction. As a result, when the brine X is fed from the tank 25 into the pressure chamber 17 of the dispensing cylinder 12 to be pressurized, the piston 13 moves upward such that the pack B is compressed. Consequently, the ice cream A is fed out of the supply opening C of the pack B, being dispensed through the pipe 332, the communicating port 346, the lower end of the dispensing passage 335 and the dispensing port 339 into the container. When a suitable amount of ice cream A is dispensed, the cock 23 is closed. Then, the dispensing switch 29 is turned off to stop the pump 27. Further, the communicating port 346 and the dispensing port 339 are closed such that the dispensing is stopped. The above-described operation is repeated so that the ice cream A is dispensed sequentially.

The ice cream A remains in the connecting pipe 332 every time it is dispensed. If the atmosphere in the connecting pipe 332 is warmed, the ice cream A melts such that its quality is reduced. In the sixth embodiment, however, the heat-insulating space 352 with good heat-insulation (bad heat-transfer) is formed around the proximal end side of the connecting pipe 332 which is susceptible to external heat. Consequently, the proximal end side of the pipe 332 can be prevented from being affected by the external heat. On the other hand, the cold air is fed around the outer circumference of the pipe 332 at the distal end side thereof so that the atmosphere at the distal end side is cooled. The cold at the distal end side is transferred through the circumferential wall to the proximal end side. Consequently, the atmosphere in the connecting pipe 332 is cooled over its whole length such that the increase in the temperature in the pipe (that is, the temperature of the ice cream A) is limited.

The cold air in the freezing compartment is not directly introduced into the dispensing section 331, and transfer of the cold at the pipe 332 side to the outside of the dispensing section 331 is rendered difficult by the heat-insulating space 352. Consequently, the outside of the dispensing section 331 can be prevented from being cooled and accordingly, the occurrence of dew condensation can be prevented. Additionally, the atmosphere in the proximal end side of the connecting pipe 332 can be cooled more effectively when the thickness of the circumferential wall thereof is increased.

Figure 17:
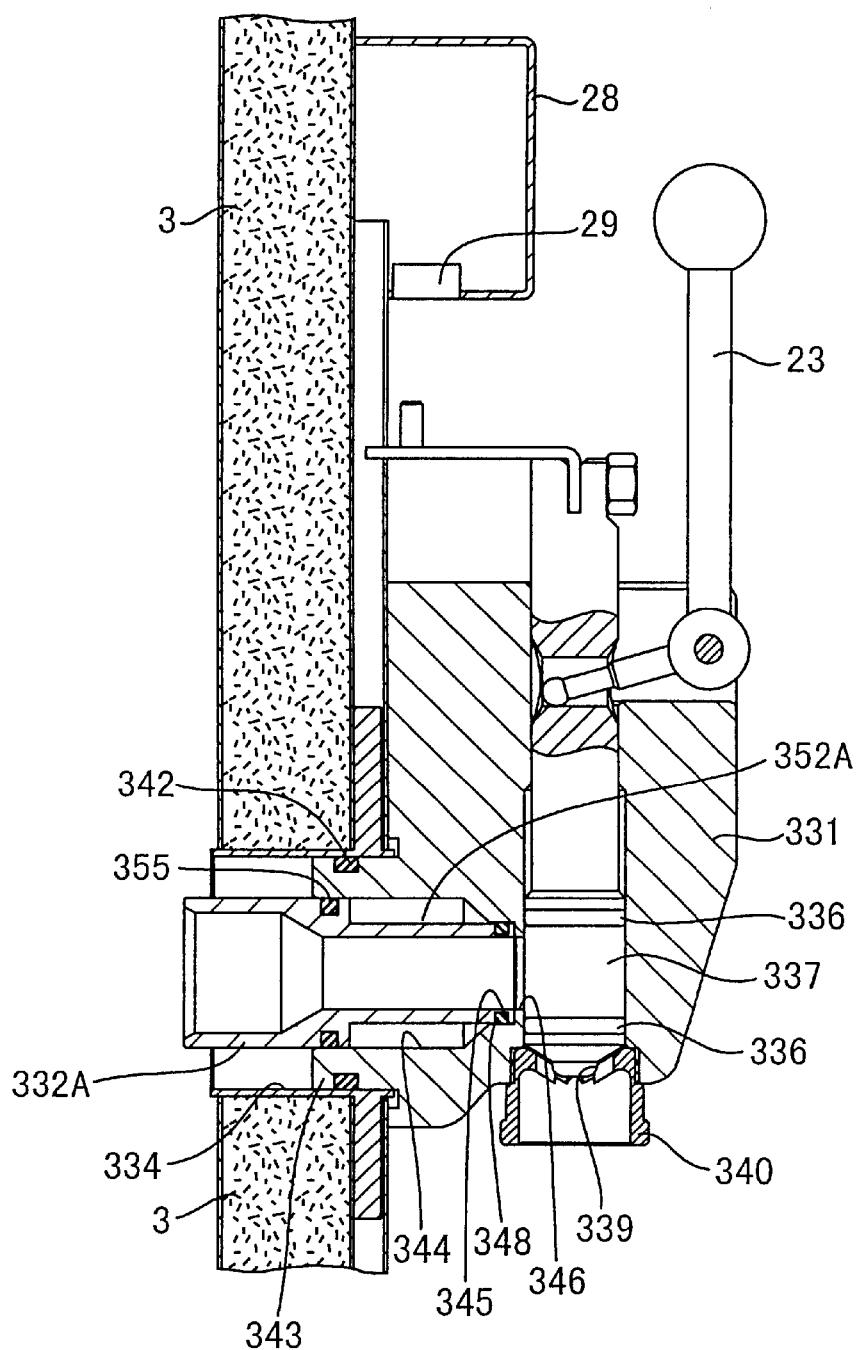
FIG. 17 is a longitudinal section of a dispensing mechanism employed in an ice cream dispenser of a seventh embodiment in accordance with the invention.

FIG. 17 illustrates a seventh embodiment of the invention. The seventh embodiment is directed to an improvement in the shape of the connecting pipe 332A. More specifically, the connecting pipe 332A includes a portion having a diameter equal to one of the distal ends thereof. An O-ring 355 is attached to the outer circumference of the portion. The connecting pipe 332A is assembled to the dispensing section 331 so that the O-ring 348 at the proximal end side adheres closely to the inner circumferential face of the mounting hole 345 and so that the O-ring 355 at the distal end side adheres closely to the inner circumferential face of the distal end of the hole 344. An annular closed heat-insulating space 352A is defined between the outer circumference of the pipe 332A located between the O-rings 355 and 348 and the inner circumference of the hole 344.

The same effect can be achieved from the seventh embodiment as from the sixth embodiment. Particularly in the seventh embodiment, the heat-insulating space 352A is defined between the O-rings 355 and 348. Consequently, a greater air tightness can be obtained and accordingly, a greater heat insulating effect can be achieved. The remaining construction in the seventh embodiment is the same as that in the sixth embodiment.

Figure 18:
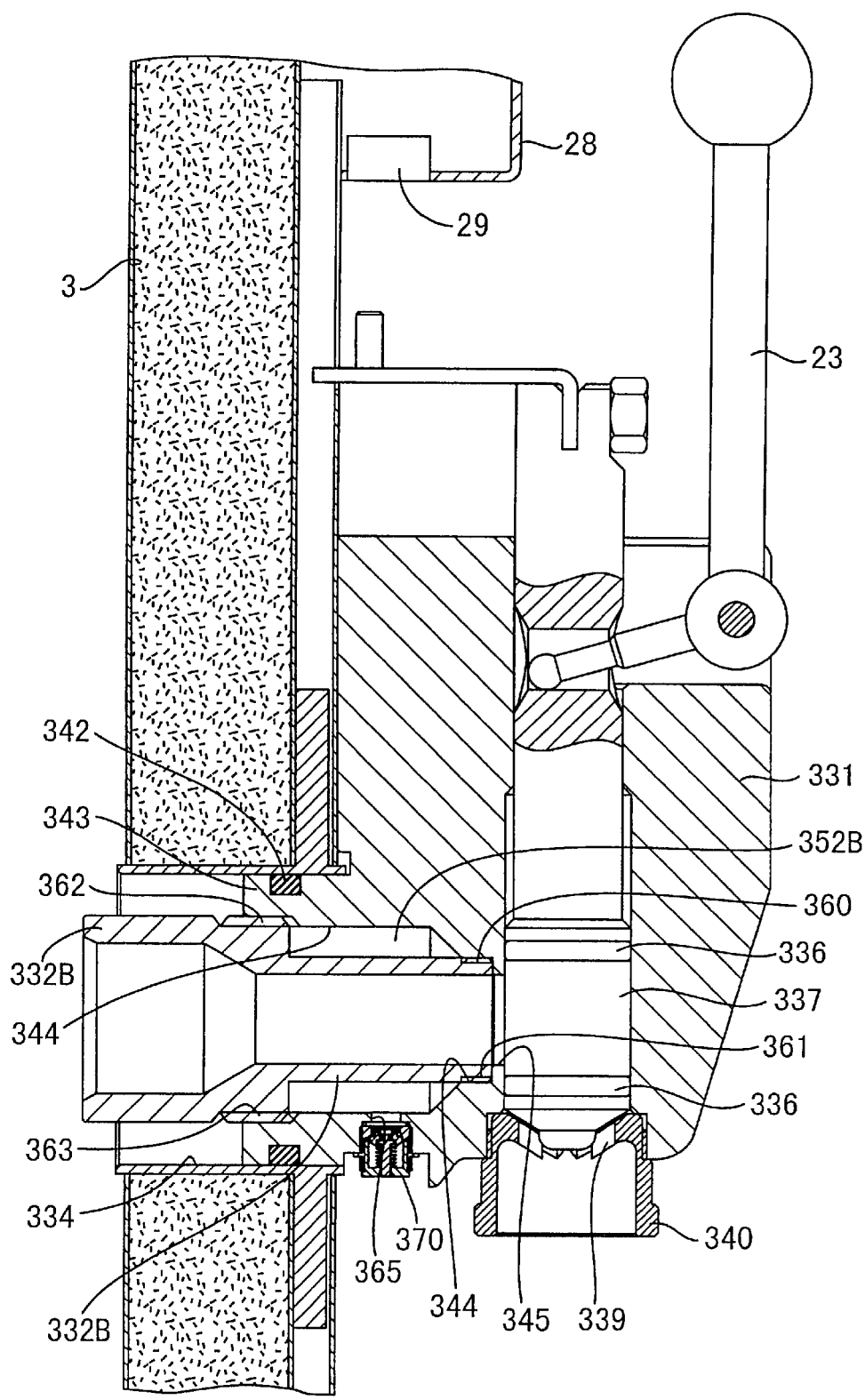
FIG. 18 is a longitudinal section of a dispensing mechanism employed in an ice cream dispenser of an eighth embodiment in accordance with the invention.
Figure 19:
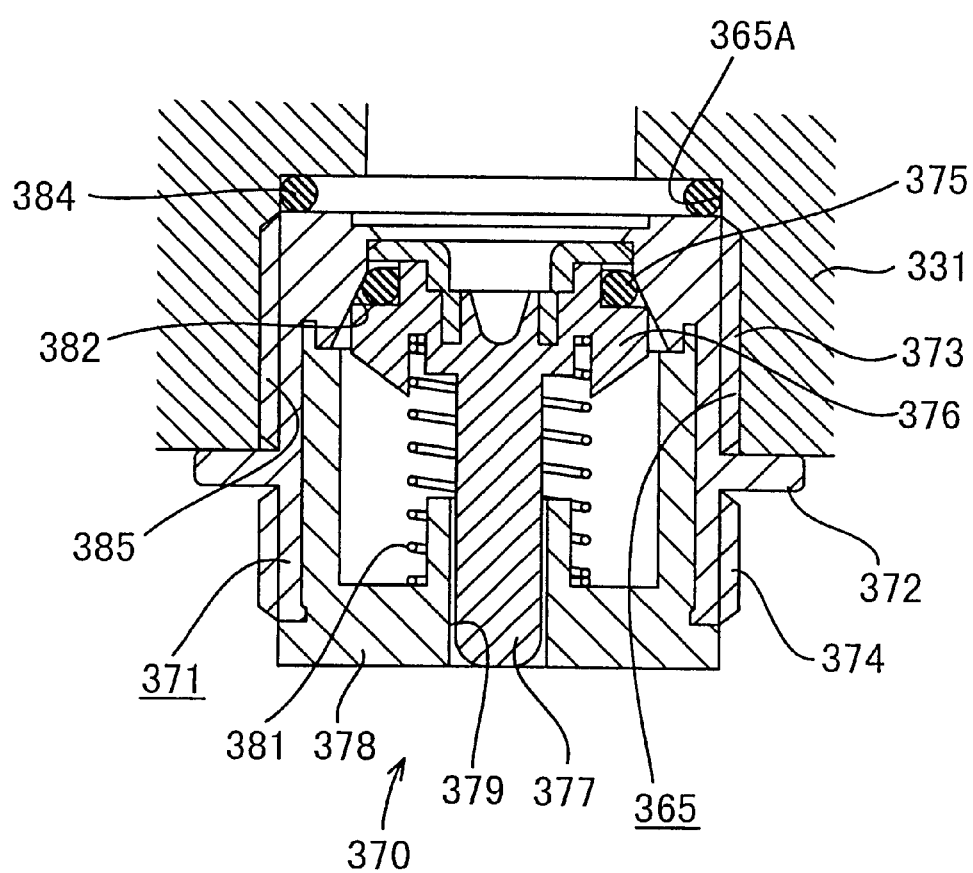
FIG. 19 is an enlarged section of a check valve mounted on a dispensing section of the eighth embodiment.

FIGS. 18 and 19 illustrate an eighth embodiment of the invention. A heat-insulating space 352B formed around the connecting pipe 332B is vacuous. More specifically, the connecting pipe 332B has a male thread 360 formed on the proximal end thereof. The dispensing section 331 has a female thread 361 formed on the inner circumferential face of the mounting hole 345 thereof. The male thread 360 is engaged with the female thread 361. The connecting pipe 332B further has a male thread 362 formed on the root of the equal diameter portion of the pipe 332b at the distal end side. The dispensing section 331 further has a female thread 363 formed on the inner circumferential face of the hole 344 at the protruding end side. The male thread 362 is engaged with the female thread 363. In this construction, an annular closed heat-insulating space 352B is defined between the outer circumference of the pipe 332B located between the engaged threads 362 and 363 and the engaged threads 360 and 361 and the inner circumference of the hole 344.

The dispensing section 331 has a downwardly open stepped mounting hole 365 formed below the heat-insulating space 352B. A check valve 370 is mounted in the hole 365. The check valve 370 comprises a cylindrical bottomed body 371 and a flange 372 formed on the outer circumferential face of the body 371. The flange 372 has upper and lower male threads 373 and 374. The body 371 encloses a valve element 376 with an O-ring 375 attached thereto. The valve element 376 is vertically movable and includes a rod 377 protruding from the backside of the valve element 376 and fitted in a guide hole 379 of a bottom wall 378 of the body 371 with clearance. The valve element 376 is urged upward by a spring force of a compression coil spring 381 provided between the backside of the valve element 376 and the bottom wall 378, whereupon the O-ring 375 is pressed against a valve seat 382 so that the check valve 370 is normally closed.

The upper male thread 373 is engaged with the female thread 385 of the mounting hole 365 with the O-ring 384 being held between the upper face of the body 371 and the stepped portion 365A of the hole 365, whereby the check valve 370 is air tightly mounted in the hole. The lower male thread 374 is used to connect a connecting pipe extending from a vacuum device (not shown) to the check valve 370, so that the vacuum device is energized. The valve seat 382 is opened against the spring force of the compression coil spring 381 so that air in the heat-insulating space 352B is gradually sucked through the clearance between the rod 377 and a guide hole 379. Thereafter, the heat-insulating space 352B is evacuated completely or almost completely, the vacuum device is deenergized and the connecting pipe is disconnected. The valve seat 382 is then closed by the spring force of the spring 381 and outside atmospheric pressure, whereby the heat-insulating space 352B is maintained in the vacuum state.

According to the eighth embodiment, the heat-insulating space 352B defined around the connecting pipe 332B is a vacuum. Consequently, a greater heat-insulating effect can be achieved. The other construction in the eighth embodiment is the same as that in the sixth embodiment.

Figure 20:
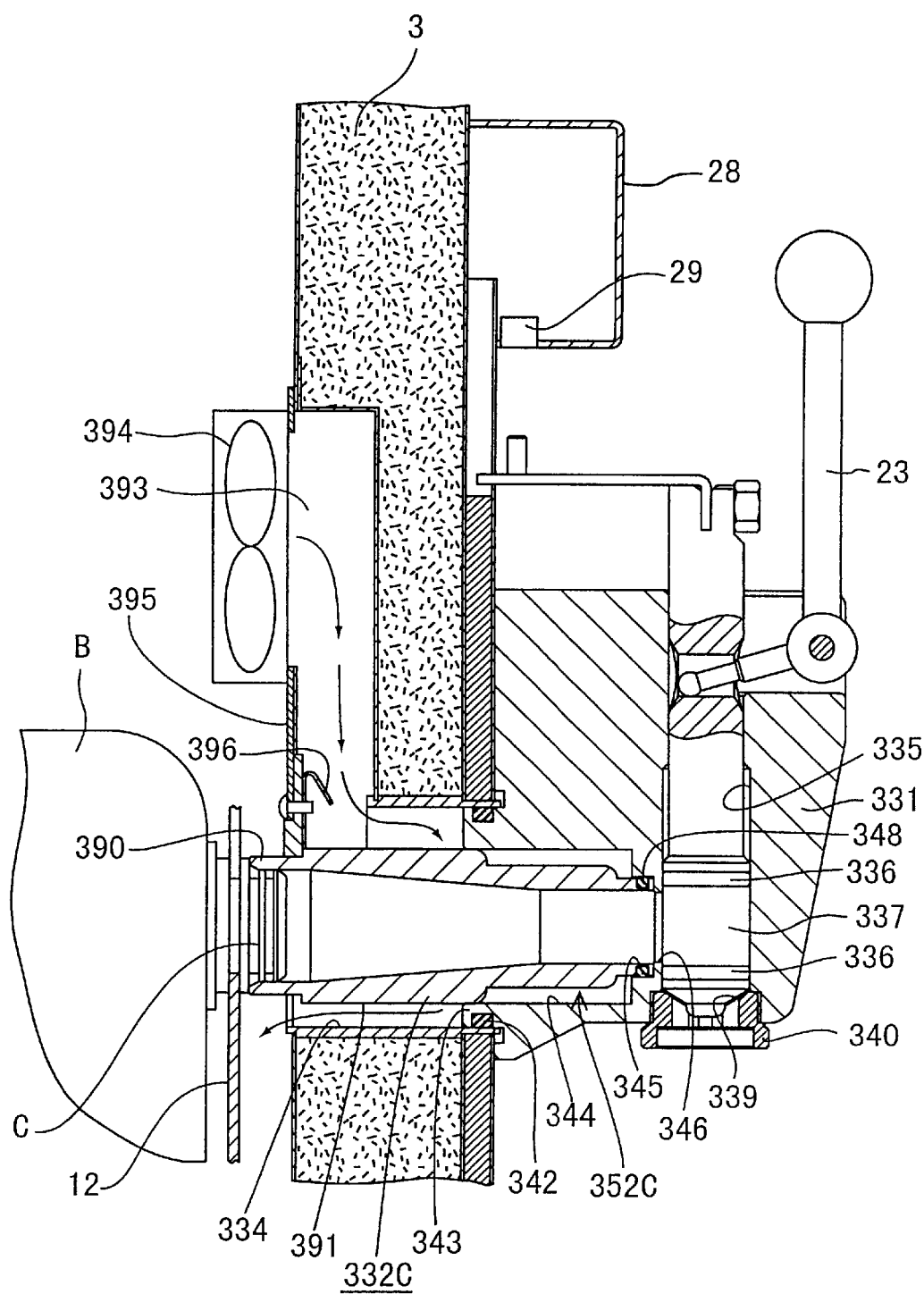
FIG. 20 is a longitudinal section of a dispensing mechanism employed in an ice cream dispenser of a ninth embodiment in accordance with the invention.
Figure 21:
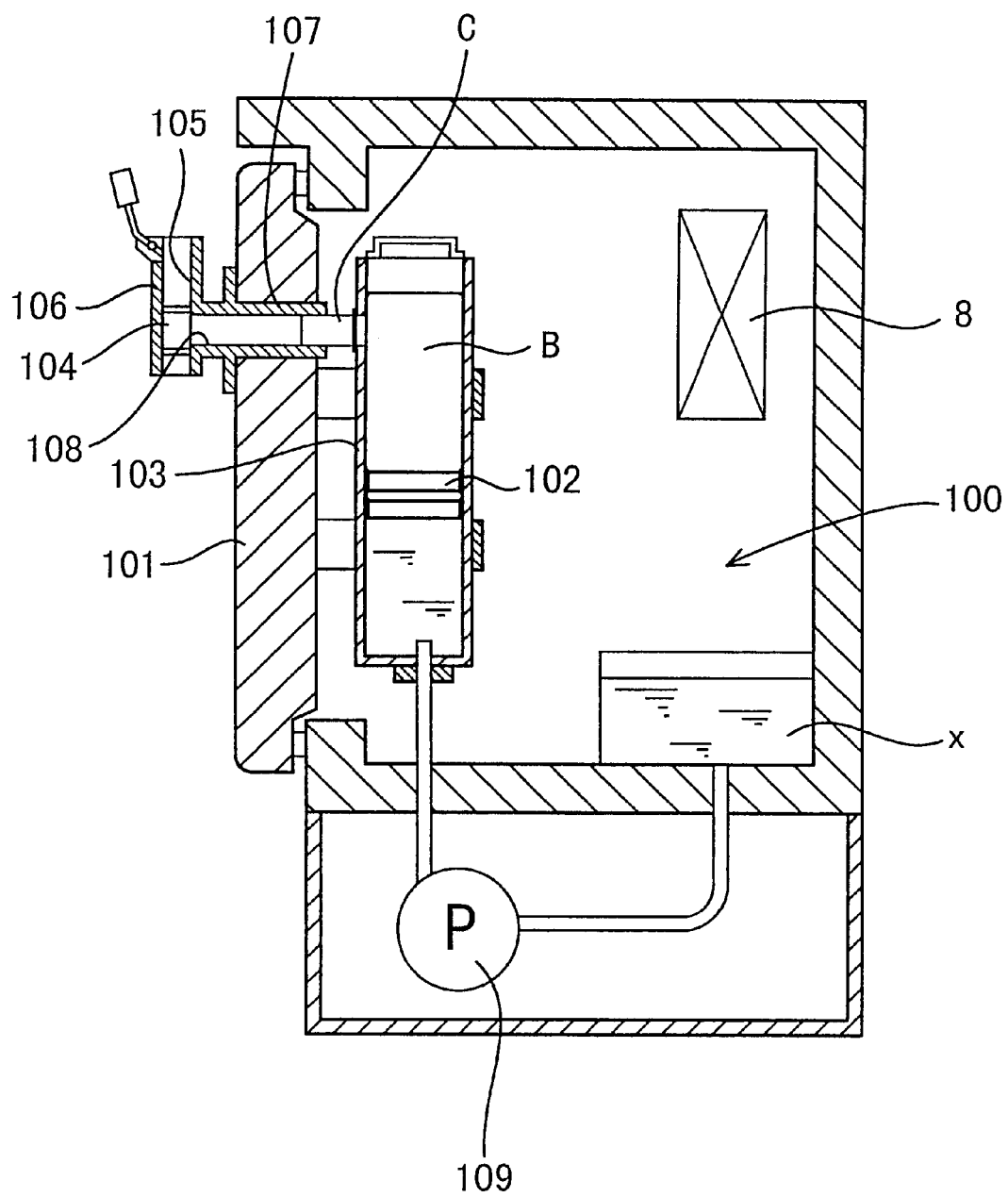
FIG. 21 is a schematic sectional view of a conventional ice cream dispenser.

FIG. 20 illustrates a ninth embodiment of the invention. The ninth embodiment is a modified form of the sixth embodiment. More specifically, the boss 343 protruding from the back of the dispensing section 331 has a hole 344 that is slightly downwardly eccentric and a mounting hole 345 formed inside the hole 344 and having a reduced diameter. The boss 343 further has a communicating port 346 formed further inside the mounting hole 345 and having a further reduced diameter. The mounting hole 345 communicates via the communicating port 346 with the lower end of the dispensing passage 335.

In forming the connecting pipe 332C, a hard alumite coat is formed on aluminum or aluminum alloy, and the hard alumite is impregnated with Teflon. The pipe 332C has a connecting portion 390 which is formed at the distal end side thereof and into which the supply opening C of the pack B is fitted. The pipe 332C includes a large diameter portion 391 in the rear of the connecting portion 390 and a portion having an outer diameter reduced at two stages toward the proximal end thereof. The O-ring 348 is attached to the proximal end side of the pipe 332C. The inner diameter of the pipe 332C is gradually reduced toward the proximal end thereof. The material of the pipe 332C includes a good heat-conductor such as aluminum, an aluminum alloy, copper or silver.

The O-ring 348 at the proximal end side adheres closely to the inner circumferential face of the hole 345 and the root side of the large diameter portion 391 is tightly fitted with the open edge of the hole 344 when the connecting pipe 332C is assembled to the dispensing section 331. In this construction, an annular closed heat-insulating space 352C is defined between a portion of the outer circumference of the pipe 332C located between the root of the large diameter portion 391 and the proximal end where the O-ring 348 is attached and the inner circumference of the hole 344.

A portion of the heat-insulated door 3 over the hole 334 at the freezing compartment side is cut off to be formed into an air guide space 393 as shown in FIG. 20. A suction blower 394 is mounted on the open edge of the air guide space 393 at the freezing compartment side. A closing plate 395 is provided for closing a space between the lower portion of the suction blower 394 and the upper portion of the pipe 332C at the distal end side. A guide plate 396 is provided on the backside of the closing plate 395. The remaining construction in the ninth embodiment is the same as that in the sixth embodiment.

The ice cream A remains in the connecting pipe 332C every time it is dispensed. However, the heat-insulating space 352C with good heat-insulation is formed around the proximal end side of the connecting pipe 332C, which is susceptible to external heat. Consequently, the proximal end side of the pipe 332 can be prevented from being affected by the external heat. Furthermore, the suction blower 394 is driven so that part of the cold air in the freezing compartment is fed into the air guide space 393. The cold air is caused to flow inside through the upper side of the large diameter portion 391 of the pipe 332C as shown by arrows in FIG. 20. Thereafter, the cold air flows to the lower side of the large diameter portion 392, returning into the freezing compartment. More specifically, the cold air is fed around the distal end side of the pipe 332C so that the atmosphere at the distal end side is cooled. The cold at the distal end side is transferred through the circumferential wall to the proximal end side. Consequently, the atmosphere in the connecting pipe 332C is cooled over its whole length such that the increase in the temperature in the pipe is limited. Since the inner diameter is reduced at the proximal end side, the distance from the circumferential wall to the center is decreased such that the atmosphere in the pipe can efficiently be cooled.

The cold air in the freezing compartment is not directly introduced into the dispensing section 331, and transfer of the cold at the pipe 332 side to the outside of the dispensing section 331 is rendered difficult by the heat-insulating space 352. Consequently, the outer surface of the dispensing section 331 can be prevented from being cooled and accordingly, the occurrence of dew condensation can be prevented.

The operating fluid for the dispensing cylinder should not be limited to brine. Another liquid may be used instead. Moreover, air or another gas may be used as the operating fluid. Furthermore, the ice cream includes soft ice cream and hard ice cream in the foregoing embodiments. The present invention may be applied to dispensing apparatus for dispensing yogurt or sherbet.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A frozen dessert dispenser comprising:
    a freezing compartment accommodating a frozen dessert dispensing cylinder therein;
    a dispensing section provided on an outer wall of the freezing compartment, the dispensing section being detachably attached to said freezing compartment and including a vertically extending dispensing passage and a valve element slidably provided in the dispensing passage; and
    a connecting pipe communicating with a side of the dispensing passage and projecting into the freezing compartment to be connected to a discharge side of the dispensing cylinder;
    wherein a portion of the dispensing passage communicating with the connecting pipe is closed and opened by the valve element and the connecting pipe is detachably attached to the dispensing passage so as to facilitate separate cleaning of the connecting pipe and the dispensing passage.

2. The frozen dessert dispenser according to claim 1, wherein the connecting pipe has an inner surface on which a fluorine-contained resin layer is formed.

3. The frozen dessert dispenser according to claim 2, wherein:
the dispensing section includes a side located at the freezing compartment and having a hole communicating with the dispensing passage;
the connecting pipe has a proximal end side fitted in the hole of the dispensing section and includes a flange formed along an outer circumference thereof so as to abut an open edge of the hole;
the open edge of the hole has a pin extending therefrom and having a mounting groove; the flange of the connecting pipe has an engagement hole engaging the mounting groove; and
the connecting pipe is turned about an axis thereof so that the engagement hole engages and disengages from the mounting groove.

4. The frozen dessert dispenser according to claim 3, wherein:
the pin includes a head and a collar spaced from the head, the pin further including a portion thereof located between the head and the collar and serving as the mounting groove;
the mounting groove has a width larger than a thickness of the flange; and
the pin extends so that the collar thereof abuts the open edge of the hole of the dispensing section.

5. The frozen dessert dispenser according to claim 4, wherein the connecting pipe includes a portion located at the dispensing section having a smaller outer diameter than another portion thereof located at the freezing compartment.

6. The frozen dessert dispenser according to claim 5, wherein a closed heat-insulating space is defined along the outer circumference of the connecting pipe.

7. The frozen dessert dispenser according to claim 4, wherein a closed heat-insulating space is defined along the outer circumference of the connecting pipe.

8. The frozen dessert dispenser according to claim 7, wherein the heat insulating space is a vacuum.

9. The frozen dessert dispenser according to claim 1, wherein:
the dispensing section includes a side located at the freezing compartment and having a hole communicating with the dispensing passage;
the connecting pipe has a proximal end fitted in the hole of the dispensing section and includes a flange formed along an outer circumference thereof so as to abut an open edge of the hole;
the open edge of the hole has a pin extending therefrom and having a mounting groove;
the flange of the connecting pipe has an engagement hole engaging the mounting groove; and
the connecting pipe is turned about an axis thereof so that the engagement hole engages and disengages from the mounting groove.

10. The frozen dessert dispenser according to claim 9, wherein:
the pin includes a head and a collar spaced from the head, the pin further including a portion thereof located between the head and the collar and serving as the mounting groove;
the mounting groove has a width larger than a thickness of the flange; and
the pin extends so that the collar thereof abuts the open edge of the hole of the dispensing section.

11. The frozen dessert dispenser according to claim 1, wherein the connecting pipe includes a portion located at the dispensing section having a smaller outer diameter than another portion thereof located at the freezing compartment.

12. The frozen dessert dispenser according to claim 11, wherein a closed heat-insulating space is defined along the outer circumference of the connecting pipe.

13. The frozen dessert dispenser according to claim 1, wherein a closed heat-insulating space is defined along the outer circumference of the connecting pipe.

14. The frozen dessert dispenser according to claim 13, wherein the heat-insulating space is a vacuum.

15. A frozen dessert dispenser comprising:
a freezing compartment accommodating a frozen dessert dispensing cylinder therein;
a dispensing section provided on an outer wall of the freezing compartment, the dispensing section being detachably attached to said freezing compartment and including a vertically extending dispensing passage and a valve element slidably provided in the dispensing passage; and
a connecting pipe communicating with a side of the dispensing passage and projecting into the freezing compartment to be connected to a discharge side of the dispensing cylinder;
wherein a portion of the dispensing passage communicating with the connecting pipe is closed and opened by the valve element and the connecting pipe includes a portion located at the dispensing section side and having a smaller outer diameter than another portion thereof located at the freezing compartment side.

16. A frozen dessert dispenser comprising:
a freezing compartment accommodating a frozen dessert dispensing cylinder therein;
a dispensing section provided on an outer wall of the freezing compartment, the dispensing section including a dispensing passage connected to a discharge side of the dispensing cylinder, the dispensing passage being provided with a valve; and
a closed heat-insulating space defined along an outer circumference of the dispensing passage.

17. The frozen dessert dispenser according to claim 16, wherein the heat insulating space is a vacuum.

18. A frozen dessert dispenser comprising:
a freezing compartment accommodating a frozen dessert dispensing cylinder therein;
a dispensing section provided on an outer wall of said freezing compartment, said dispensing section including a vertically extending dispensing passage and a valve element slidably provided in said dispensing passage, said dispensing section further including a hole communicating with said dispensing passage; and
a connecting pipe communicating with a side of said dispensing passage and projecting into said freezing compartment to be connected to a discharge side of said dispensing cylinder, said connecting pipe having an inner surface formed of a fluorine-contained resin layer and a proximal end fitted in said hole of said dispensing section, said connecting pipe further including a flange formed along an outer circumference of said connecting pipe so as to abut an open edge of said hole, said open edge of said hole having a pin extending therefrom, said pin having a mounting groove, and said flange of said connecting pipe having an engagement hole engaging said mounting groove, wherein said connecting pipe is turnable about an axis thereof so that said engagement hole engages and disengages from said mounting groove, said connecting pipe communicating with a portion of said dispensing passage, and wherein said portion of dispensing passage is closed and opened by said valve element and said connecting pipe is detachably attached to said dispensing passage.

19. The frozen dessert dispenser according to claim 18, wherein said dispensing section is detachably attached to said freezing compartment.

20. The frozen dessert dispenser according to claim 18, further comprising a cap having a dispensing port, said cap being removably connected to an end portion of said dispensing passage.

21. A frozen dessert dispenser comprising:

a freezing compartment accommodating a frozen dessert dispensing cylinder therein;

a dispensing section provided on an outer wall of said freezing compartment, said dispensing section including a vertically extending dispensing passage and a valve element slidably provided in said dispensing passage, said dispensing section further including a side proximate to said freezing compartment and a hole communicating with said dispensing passage; and a connecting pipe communicating with a side of said dispensing passage and projecting into said freezing compartment to be connected to a discharge side of said dispensing cylinder, said connecting pipe having a proximal end fitted in said hole of said dispensing section and including a flange formed along an outer circumference of said connecting pipe so as to abut an open edge of said hole, said open edge of said hole having a pin extending therefrom, said pin having a mounting groove, and said flange of said connecting pipe having an engagement hole engaging said mounting groove, wherein said connecting pipe is turnable about an axis thereof so that said engagement hole engages and disengages from said mounting groove, said connecting pipe communicating with a portion of said dispensing passage, and wherein said portion of dispensing passage is closed and opened by said valve element and said connecting pipe is detachably attached to said dispensing passage.

22. The frozen dessert dispenser according to claim 21, wherein said dispensing section is detachably attached to said freezing compartment.

23. The frozen dessert dispenser according to claim 21, further comprising a cap having a dispensing port, said cap being removably connected to an end portion of said dispensing passage.

24. The frozen dessert dispenser according to claim 21, wherein:

said pin includes a head and a collar spaced from said head, said pin further including a portion thereof located between said head and said collar and serving as said mounting groove;

said mounting groove having a width larger than a thickness of said flange; and said pin stands so that said collar thereof abuts said open edge of said hole of the dispensing section.

25. A frozen dessert dispenser comprising:

a freezing compartment accommodating a frozen dessert dispensing cylinder therein;

a dispensing section provided on an outer wall of the freezing compartment, the dispensing section including a vertically extending dispensing passage and a valve element slidably provided in the dispensing passage; and a connecting pipe communicating with a side of the dispensing passage and projecting into the freezing compartment to be connected to a discharge side of the dispensing cylinder, the connecting pipe including a portion located at the dispensing section having a smaller outer diameter than another portion thereof located at the freezing compartment, wherein a portion of the dispensing passage communicating with the connecting pipe is closed and opened by the valve element and the connecting pipe is detachably attached to the dispensing passage so as to facilitate separate cleaning of said connecting pipe and said dispensing passage.

26. The frozen dessert dispenser according to claim 25, wherein the dispensing section is detachably attached to the freezing compartment.

27. The frozen dessert dispenser according to claim 25, farther comprising a cap having a dispensing port, the cap being removably connected to an end portion of the dispensing passage.

28. The frozen dessert dispenser according to claim 25, wherein a closed heat-insulating space is defined along an outer circumference of the connecting pipe.

29. A frozen dessert dispenser comprising:

a freezing compartment accommodating a frozen dessert dispensing cylinder therein;

a dispensing section provided on an outer wall of the freezing compartment, the dispensing section including a vertically extending dispensing passage and a valve element slidably provided in the dispensing passage; and a connecting pipe communicating with a side of the dispensing passage and projecting into the freezing compartment to be connected to a discharge side of the dispensing cylinder, said connecting pipe having a closed heat-insulating space defined along an outer circumference thereof, wherein a portion of the dispensing passage communicating with the connecting pipe is closed and opened by the valve element and the connecting pipe is detachably attached to the dispensing passage so as to facilitate separate cleaning of said connecting pipe and said dispensing passage.

30. The frozen dessert dispenser according to claim 29, wherein said dispensing section is detachably attached to said freezing compartment.

31. The frozen dessert dispenser according to claim 29, further comprising a cap having a dispensing port, said cap being removably connected to an end portion of said dispensing passage.

32. The frozen dessert dispenser according to claim 29, wherein said heat-insulating space is a vacuum.

* * * * *